(12) United States Patent
Guo et al.

(10) Patent No.: US 12,200,633 B2
(45) Date of Patent: *Jan. 14, 2025

(54) POWER CONTROL METHOD AND APPARATUS

(71) Applicant: Huawei Technologies Co., Ltd., Shenzhen (CN)

(72) Inventors: Wenting Guo, Shenzhen (CN); Zhengzheng Xiang, Shanghai (CN); Lei Lu, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 18/491,566

(22) Filed: Oct. 20, 2023

(65) Prior Publication Data
US 2024/0064655 A1 Feb. 22, 2024

Related U.S. Application Data

(63) Continuation of application No. 17/356,150, filed on Jun. 23, 2021, now Pat. No. 11,825,425, which is a (Continued)

(30) Foreign Application Priority Data

Dec. 24, 2018 (CN) .......................... 201811588371.0

(51) Int. Cl.
H04W 52/32 (2009.01)
H04W 52/24 (2009.01)
H04W 52/36 (2009.01)

(52) U.S. Cl.
CPC ....... H04W 52/325 (2013.01); H04W 52/242 (2013.01); H04W 52/245 (2013.01); H04W 52/367 (2013.01)

(58) Field of Classification Search
CPC ............ H04W 52/325; H04W 52/242; H04W 52/245; H04W 52/367
See application file for complete search history.

(56) References Cited

U.S. PATENT DOCUMENTS 11,303,494 B2 * 4/2022 Atungsiri ............ H04L 27/2692
2014/0086202 A1 * 3/2014 Nagata .................. H04L 5/0039
370/330
(Continued)

FOREIGN PATENT DOCUMENTS

CN 107736074 A 2/2018
CN 108964851 A 12/2018
(Continued)

OTHER PUBLICATIONS

3GPP TS 36.211 V15.3.0 (Sep. 2018), 3rd Generation Partnership Project; Technical Specification Group Radio Access Network; Evolved Universal Terrestrial Radio Access (E-UTRA); Physical channels and modulation (Release 15), 237 pages.
(Continued)

Primary Examiner — John J Lee
(74) Attorney, Agent, or Firm — Slater Matsil, LLP

(57) ABSTRACT

A first terminal device determines a transmit power of a data channel, wherein the transmit power of the data channel comprise a first data channel part and a transmit power of a second data channel part, where the first data channel part is a part of the data channel that has a same time domain resource with a control channel, and the second data channel part is another part of the data channel that has a different time domain resource with the control channel. The first terminal device sends data in the first data channel part at the transmit power of the first data channel part, and sends data in the second data channel part at the transmit power of the (Continued)

second data channel part. This application may be applied to internet of vehicles, for example, V2X, LTE-V, and V2V.

20 Claims, 10 Drawing Sheets

Related U.S. Application Data continuation of application No. PCT/CN2019/126243, filed on Dec. 18, 2019.

(56) References Cited

U.S. PATENT DOCUMENTS

| 2017/0188391 | A1 | 6/2017 | Rajagopal et al. | |
|---|---|---|---|---|
| 2020/0107321 | A1* | 4/2020 | Yang | H04W 72/23 |
| 2021/0360683 | A1* | 11/2021 | Chen | H04W 72/0453 |

FOREIGN PATENT DOCUMENTS

| CN | 109039564 | A | 12/2018 |
|---|---|---|---|
| EP | 3592070 | A1 | 1/2020 |
| KR | 20180063265 | A | 6/2018 |
| WO | 2017026511 | A1 | 2/2017 |
| WO | 2018038565 | A1 | 3/2018 |
| WO | 2018174688 | A1 | 9/2018 |

OTHER PUBLICATIONS

3GPP TS 36.213 V15.3.0 (Sep. 2018), "14-UE procedures related to Sidelink; 16-UE Procedures related to narrowband IoT; 17-Wake-up signal related procedures for BL/CE UE", Release 15, pp. 474-529.
3GPP TS 38.101-1 V15.3.0 (Sep. 2018), 3rd Generation Partnership Project; Technical Specification Group Radio Access Network; NR; User Equipment (UE) radio transmission and reception; Part 1: Range 1 Standalone (Release 15), 219 pages.
3GPP TS 38.213 V15.3.0 (Sep. 2018), 3rd Generation Partnership Project; Technical Specification Group Radio Access Network; NR; Physical layer procedures for control (Release 15), 101 pages.
3GPP TS 38.214 V15.3.0 (Sep. 2018), 3rd Generation Partnership Project; Technical Specification Group Radio Access Network; NR; Physical layer procedures for data (Release 15), 96 pages.
3GPP TS 38.215 V15.3.0 (Sep. 2018), 3rd Generation Partnership Project; Technical Specification Group Radio Access Network; NR; Physical layer measurements (Release 15), 15 pages.
3GPP TS 38.331 V15.3.0 (Sep. 2018), 3rd Generation Partnership Project; Technical Specification Group Radio Access Network; NR; Radio Resource Control (RRC) protocol specification (Release 15), 445 pages.
CATT, "Discussion on coexistence of LTE sidelink and NR sidelink in NR V2X", 3GPP TSG RAN1 Meeting #95, R1-1812624, Spokane, WA, USA, Nov. 12-16, 2018, 7 pages.
Chen, S. et al., "Technologies, standards and applications of LTE-V2X for vehicular networks", Telecommunications Science, Apr. 3, 2018, 11 pages.
Huawei et al., "Sidelink physical layer structure for NR V2X", 3GPP TSG RAN WG1 Meeting #95, R1-1812206, Spokane, WA, USA, Nov. 12-16, 2018, 12 pages.
Huawei et al., "Power control and power sharing for V2X sidelink", 3GPP TSG RAN WG1 Meeting #96bis, R1-1904691, Xi'an, China, Apr. 8-12, 2019, R1-1904691, 6 pages.
Intel Corporation, "Sidelink Power Control for Wearable and IoT Use Cases", 3GPP TSG RAN WG1 Meeting#90, R1-1712520Prague, Czech Republic, Aug. 21-25, 2017, 5 pages.
Nokia et al., "Discussion on sidelink power control", 3GPP TSG-RAN WG1 Meeting #90, Prague, R1-1714002, Czech Republic, Aug. 21-25, 2017, 3 pages.
Huawei et al., "Sidelink physical layer procedures for NR V2X", 3GPP TSG RAN WG1 Meeting #95, R1-1812205, Spokane, WA, US, Nov. 12-16, 2018, 12 pages.
Samsung, "On Sidelink Power Control", 3GPP TSG RAN WG1 #96bis, R1-1904435, Xi'an, China, Apr. 8-12, 2019, 8 pages.

\* cited by examiner

POWER CONTROL METHOD AND APPARATUS

CROSS-REFERENCE TO RELATED APPLICATIONS

This application is a continuation of U.S. patent application Ser. No. 17/356,150, filed on Jun. 23, 2021, which is a continuation of International Application No. PCT/CN2119/126243, filed on Dec. 18, 2019, which claims priority to Chinese Patent Application No. 201811588371.0, filed on Dec. 24, 2018. All of the afore-mentioned patent applications are hereby incorporated by reference in their entireties.

TECHNICAL FIELD

This application relates to the field of communications technologies, and in particular, to a power control method and apparatus.

BACKGROUND

In a network of a long term evolution (LTE) technology proposed in the 3rd generation partnership project (3GPP), an internet-of-vehicles technology for vehicle-to-everything (V2X) communication is proposed. The V2X communication refers to communication between a vehicle and everything outside the vehicle, and includes vehicle-to-vehicle (V2V) communication, vehicle-to-pedestrian (V2P) communication, vehicle-to-infrastructure (V2I) communication, and vehicle-to-network (V2N) communication.

The V2X communication is intended for high-speed devices such as vehicles, and is a basic and key technology applied to a scenario with a very high requirement for communication latency in the future. For example, the scenario may be a scenario involving an intelligent vehicle, self-driving, or an intelligent transportation system. Based on the V2X communication, a vehicle user can periodically send, to surrounding vehicle users, some information of the vehicle user, for example, information about a location, a speed, intent (turning, merging, reversing), and some information triggered by aperiodic events. Similarly, the vehicle user may receive information about surrounding users in real time.

A service type mainly used in LTE-V2X is a broadcast message. Therefore, a V2X receive end user is not determined, and all interested V2X users may be in a listening state. Therefore, a transmit end sends data information at a maximum transmit power. In addition, in a scenario with network coverage, an LTE-V2X signal is sent in an uplink slot, and interference of a V2X transmit power to uplink receiving on a base station side needs to be considered.

Therefore, how to perform power control allocation and power control in NR-V2X urgently needs to be resolved.

SUMMARY

Embodiments of this application provide a power control method and apparatus, so that power control can be properly performed.

According to a first aspect, an embodiment of this application provides a power control method, including:

A first terminal device determines a transmit power of a first data channel part and a transmit power of a second data channel part, where the first data channel part is a data channel part that overlaps a control channel in time domain and does not overlap the control channel in frequency domain, and the second data channel part is a data channel part that overlaps the control channel in frequency domain and does not overlap the control channel in time domain. The first terminal device sends data in the first data channel part to a second terminal device at the transmit power of the first data channel part, and sends data in the second data channel part to the second terminal device at the transmit power of the second data channel part.

Power control may be performed differently on different data channel parts by distinguishing between the first data channel part and the second data channel part. For example, the data in the first data channel part and the data in the second data channel part may be sent at different transmit powers. This avoids sending of data at a same transmit power in all cases, thereby avoiding a waste of resources. For example, this avoids a case in which the transmit power of the first data channel part or the second data channel part is excessively high when a transmit power of a data channel is determined based on a same manner, and actually, data can be sent without the excessively high transmit power. In this case, the data channel is divided into two parts, and transmit powers of the two parts are determined respectively. This can satisfy power requirements of different data channel parts, avoid sending data at the same transmit power in all cases which causes the excessively high transmit power of the first data channel part or the second data channel part and causes interference to another terminal device, further reduce the interference to the another terminal device, and improve system performance.

With reference to the first aspect, in a possible implementation, when a bandwidth of the control channel is N, and a bandwidth of a data channel is M, a bandwidth of the first data channel part is M−N, where M is greater than N. The transmit power of the first data channel part is determined based on a maximum transmit power, the bandwidth M−N of the first data channel part, and the bandwidth N of the control channel.

With reference to any one of the first aspect or possible implementations of the first aspect, the transmit power of the first data channel part satisfies the following formula:

$$P_1 = \min\{P_{CMAX} - f(N, M-N), f(M-N) + P_O + \alpha \cdot PL\}$$

$P_1$ is the transmit power of the first data channel part, $P_{CMAX}$ is the maximum transmit power, $f(N, M-N)$ is a function of the bandwidth M−N of the first data channel part and the bandwidth N of the control channel, $f(M-N)$ is a function of the bandwidth M−N of the first data channel part, $P_O$ is a target received power of the second terminal device, and PL is a reference link loss.

In this embodiment of this application, the transmit power of the first data channel part is determined based on the actual bandwidth M−N of the first data channel part, to avoid a case in which a transmit power of the data channel is inaccurately determined because there are a first data channel part and a second data channel part that have different bandwidths on the data channel. In this way, accuracy of determining the transmit power of the first data channel part is improved.

With reference to any one of the first aspect or possible implementations of the first aspect, a ratio of the transmit power of the second data channel part to the transmit power of the first data channel part is positively correlated with a ratio of a bandwidth of the second data channel part to the bandwidth of the first data channel part.

With reference to any one of the first aspect or possible implementations of the first aspect, the transmit power of the second data channel part satisfies the following formula:

$$P_2 = P_1 + f(M/(M-N))$$

P₂ is the transmit power of the second data channel part, and f(M/(M−N)) is a function of a bandwidth M of the second data channel part and the bandwidth M−N of the first data channel part.

In this embodiment of this application, data is sent at a same transmit power on a resource element (resource element, RE) in the first data channel part and an RE in the second data channel part, and the ratio of the bandwidth of the first data channel part to the bandwidth of the second data channel part is used to determine the ratio of the transmit power of the first data channel part to the transmit power of the second data channel part. On one hand, this may effectively resolve a problem that available effective bandwidths on different symbols (symbol) on the data channel are different. On the other hand, this further improves efficiency of determining a received intermediate frequency scaling factor by the second terminal device, to be specific, the second terminal device may scale the second data channel part based on the intermediate frequency scaling factor of the first data channel part and the ratio of the bandwidth of the first data channel part to the bandwidth of the second data channel part. Therefore, received data of an entire slot is in a proper received power range.

With reference to any one of the first aspect or possible implementations of the first aspect, the transmit power of the second data channel part is determined based on the maximum transmit power, and a link budget of the second data channel part, and the link budget of the second data channel part is determined based on a bandwidth M of the second data channel part.

With reference to any one of the first aspect or possible implementations of the first aspect, the transmit power of the second data channel part satisfies the following formula:

$$P_2 = \min\{P_{CMAX}, f(M) + P_O + \alpha \cdot PL\}$$

P₂ is the transmit power of the second data channel part, $P_{CMAX}$ is the maximum transmit power, f(M) is a function of the bandwidth M of the second data channel part, $P_O$ is the target received power of the second terminal device, and PL is the reference link loss.

In this embodiment of this application, data is sent at different transmit powers on the RE in the first data channel part and the RE in the second data channel part, so that the transmit power of the data channel can be maximized. Specifically, a transmit power of each RE in the second data channel part is increased as much as possible. Therefore, a higher SNR is obtained, and decoding performance is improved.

With reference to any one of the first aspect or possible implementations of the first aspect, the reference link loss PL is determined based on an uplink/downlink transmission loss in a serving cell or a link transmission loss, and the link transmission loss includes a sidelink transmission loss; and the link transmission loss is a link loss from the first terminal device to the second terminal device; the link transmission loss is a largest value of link losses from the first terminal device to terminal devices that are in a first terminal device set; or the link transmission loss is a largest value of link losses from the first terminal device to terminal devices that are in a second terminal device set, where the second terminal device set belongs to the first terminal device set, and a first parameter of the terminal device in the second terminal device set satisfies a threshold range of the first parameter.

With reference to any one of the first aspect or possible implementations of the first aspect, the first parameter is any one of a reference signal received power RSRP, a signal to interference plus noise ratio SINR, a signal-to-noise ratio SNR, or a channel quality indicator CQI.

In this embodiment of this application, the reference link loss is determined based on the uplink/downlink transmission loss in the serving cell or the link transmission loss, to reduce a transmit power of the first terminal device, thereby reducing interference to another terminal device, and improving system performance.

With reference to any one of the first aspect or possible implementations of the first aspect, before the first terminal device determines the transmit power of the first data channel part and the transmit power of the second data channel part, the method further includes:

The first terminal device receives indication information from a network device, where the indication information is used to indicate the transmit power of the second data channel part; and that a first terminal device determines a transmit power of a first data channel part and a transmit power of a second data channel part includes: The first terminal device determines, based on the indication information, that the transmit power of the second data channel part satisfies the formula $P_2 = P_1 + f(M/(M-N))$ or $P_2 = \min\{P_{CMAX}, f(M) + P_O + \alpha \cdot PL\}$, where P₂ is the transmit power of the second data channel part, f(M/(M−N)) is the function of the bandwidth M of the second data channel part and the bandwidth M−N of the first data channel part, $P_{CMAX}$ is the maximum transmit power, f(M) is the function of the bandwidth M of the second data channel part, $P_O$ is the target received power of the second terminal device, and PL is the reference link loss.

In this embodiment of this application, the indication information from the network device is received, so that the first terminal device clearly learns of a condition that the transmit power of the second data channel part satisfies, thereby improving efficiency of determining the transmit power of the second data channel part by the first terminal device.

With reference to any one of the first aspect or possible implementations of the first aspect, the transmit power of the first data channel part satisfies the following formula:

$$P_1 = \min\{P_{CMAX} - f(N, M-N), f(M-N) + P_O + \alpha \cdot PL, P_T - f(N, M-N)\}$$

P₁ is the transmit power of the first data channel part, $P_{CMAX}$ is the maximum transmit power, f(N,M−N) is a function of the bandwidth M−N of the first data channel part and the bandwidth N of the control channel, f(M−N) is a function of the bandwidth M−N of the first data channel part, $P_O$ is a target received power of the second terminal device, PL is a reference link loss, and $P_T$ is a transmit power positively correlated with a priority of a service carried by data sent on the data channel.

With reference to any one of the first aspect or possible implementations of the first aspect, the transmit power of the second data channel part satisfies the following formula:

$$P_2 = \min\{P_{CMAX}, f(M) + P_O + \alpha \cdot PL, P_T\}$$

P₂ is the transmit power of the second data channel part, $P_{CMAX}$ is the maximum transmit power, f(M) is a function of a bandwidth M of the second data channel part, $P_O$ is a target received power of the second terminal device, PL is a reference link loss, and $P_T$ is a transmit power positively correlated with a priority of a service carried by data sent on the data channel.

With reference to any one of the first aspect or possible implementations of the first aspect, $P_T$ is a semi-static value configured by a network device, or $P_T$ is a preconfigured fixed value.

In this embodiment of this application, the transmit power of the first data channel part and the transmit power of the second data channel part are determined based on $P_T$, so that a high-priority service is preferably transmitted, and transmission reliability of the high-priority service is improved.

With reference to any one of the first aspect or possible implementations of the first aspect, the transmit power of the first data channel part satisfies the following formula:

$$P_1 = \min\{P_{CMAX} - f(N, M-N), f(M-N) + P_O + \alpha \cdot PL, P_{MAX\_CBR} - f(N, M-N)\}$$

$P_1$ is the transmit power of the first data channel part, $P_{CMAX}$ is the maximum transmit power, $f(N, M-N)$ is a function of the bandwidth M−N of the first data channel part and the bandwidth N of the control channel, $f(M-N)$ is a function of the bandwidth M−N of the first data channel part, $P_O$ is a target received power of the second terminal device, PL is a reference link loss, and $P_{MAX\_CBR}$ is a power determined based on a channel busy degree.

With reference to any one of the first aspect or possible implementations of the first aspect, the transmit power of the second data channel part satisfies the following formula:

$$P_2 = \min\{P_{CMAX}, f(M) + P_O + \alpha \cdot PL, P_{MAX\_CBR}\}$$

$P_2$ is the transmit power of the second data channel part, $P_{CMAX}$ is the maximum transmit power, $f(M)$ is a function of a bandwidth M of the second data channel part, $P_O$ is a target received power of the second terminal device, PL is a reference link loss, and $P_{MAX\_CBR}$ is a power determined based on a channel busy degree.

According to a second aspect, an embodiment of this application provides a power control apparatus, including: a processing unit, configured to determine a transmit power of a first data channel part and a transmit power of a second data channel part, where the first data channel part is a data channel part that overlaps a control channel in time domain and does not overlap the control channel in frequency domain, and the second data channel part is a data channel part that overlaps the control channel in frequency domain and does not overlap the control channel in time domain; and a sending unit, configured to: send data in the first data channel part to a second terminal device at the transmit power of the first data channel part, and send data in the second data channel part to the second terminal device at the transmit power of the second data channel part.

With reference to the second aspect, in a possible implementation, when a bandwidth of the control channel is N, and a bandwidth of a data channel is M, a bandwidth of the first data channel part is M−N, where M is greater than N. The transmit power of the first data channel part is determined based on a maximum transmit power, the bandwidth M−N of the first data channel part, and the bandwidth N of the control channel.

With reference to any one of the second aspect or possible implementations of the second aspect, the transmit power of the first data channel part satisfies the following formula:

$$P_1 = \min\{P_{CMAX} - f(N, M-N), f(M-N) + P_O + \alpha \cdot PL\}$$

$P_1$ is the transmit power of the first data channel part, $P_{CMAX}$ is the maximum transmit power, $f(N, M-N)$ is a function of the bandwidth M−N of the first data channel part and the bandwidth N of the control channel, $f(M-N)$ is a function of the bandwidth M−N of the first data channel part, $P_O$ is a target received power of the second terminal device, and PL is a reference link loss.

With reference to any one of the second aspect or possible implementations of the second aspect, a ratio of the transmit power of the second data channel part to the transmit power of the first data channel part is positively correlated with a ratio of a bandwidth of the second data channel part to the bandwidth of the first data channel part.

With reference to any one of the second aspect or possible implementations of the second aspect, the transmit power of the second data channel part satisfies the following formula:

$$P_2 = P_1 + f(M/(M-N))$$

$P_2$ is the transmit power of the second data channel part, and $f(M/(M-N))$ is a function of a bandwidth M of the second data channel part and the bandwidth M−N of the first data channel part.

With reference to any one of the second aspect or possible implementations of the second aspect, the transmit power of the second data channel part is determined based on the maximum transmit power, and a link budget of the second data channel part, and the link budget of the second data channel part is determined based on a bandwidth M of the second data channel part.

With reference to any one of the second aspect or possible implementations of the second aspect, the transmit power of the second data channel part satisfies the following formula:

$$P_2 = \min\{P_{CMAX}, f(M) + P_O + \alpha \cdot PL\}$$

$P_2$ is the transmit power of the second data channel part, $P_{CMAX}$ is the maximum transmit power, $f(M)$ is a function of the bandwidth M of the second data channel part, $P_O$ is the target received power of the second terminal device, and PL is the reference link loss.

With reference to any one of the second aspect or possible implementations of the second aspect, the reference link loss PL is determined based on an uplink/downlink transmission loss in a serving cell or a link transmission loss, and the link transmission loss includes a sidelink transmission loss; and the link transmission loss is a link loss from the first terminal device to the second terminal device; the link transmission loss is a largest value of link losses from the first terminal device to terminal devices that are in a first terminal device set; or the link transmission loss is a largest value of link losses from the first terminal device to terminal devices that are in a second terminal device set, where the second terminal device set belongs to the first terminal device set, and a first parameter of the terminal device in the second terminal device set satisfies a threshold range of the first parameter.

With reference to any one of the second aspect or possible implementations of the second aspect, the first parameter is any one of a reference signal received power RSRP, a signal to interference plus noise ratio SINR, a signal-to-noise ratio SNR, or a channel quality indicator CQI.

With reference to any one of the second aspect or possible implementations of the second aspect, the apparatus further includes: a receiving unit, configured to receive indication information from a network device, where the indication information is used to indicate the transmit power of the second data channel part. The processing unit is specifically configured to determine, based on the indication information, that the transmit power of the second data channel part satisfies the formula $P_2 = P_1 + f(M(M-N))$ or $P_2 = \min\{P_{CMAX}, f(M) + P_O + \alpha \cdot PL\}$, where $P_2$ is the transmit power of the second data channel part, $f(M/(M-N))$ is the function of the bandwidth M of the second data channel part and the bandwidth M−N of the first data channel part, $P_{CMAX}$ is the maximum transmit power, f(M) is the function of the bandwidth M of the second data channel part, $P_O$ is the target received power of the second terminal device, and PL is the reference link loss.

With reference to any one of the second aspect or possible implementations of the second aspect, the transmit power of the first data channel part satisfies the following formula:

$$P_1=\min\{P_{CMAX}-f(N,M-N), f(M-N)+P_O+\alpha \cdot PL, P_T-f(N,M-N)\}$$

$P_1$ is the transmit power of the first data channel part, $P_{CMAX}$ is the maximum transmit power, f(N,M−N) is a function of the bandwidth M−N of the first data channel part and the bandwidth N of the control channel, f(M−N) is a function of the bandwidth M−N of the first data channel part, $P_O$ is a target received power of the second terminal device, PL is a reference link loss, and $P_T$ is a transmit power positively correlated with a priority of a service carried by data sent on the data channel.

With reference to any one of the second aspect or possible implementations of the second aspect, the transmit power of the second data channel part satisfies the following formula:

$$P_2=\min\{P_{CMAX}f(M)+P_O+\alpha \cdot PL, P_T\}$$

$P_2$ is the transmit power of the second data channel part, $P_{CMAX}$ is the maximum transmit power, f(M) is a function of a bandwidth M of the second data channel part, $P_O$ is a target received power of the second terminal device, PL is a reference link loss, and $P_T$ is a transmit power positively correlated with a priority of a service carried by data sent on the data channel.

With reference to any one of the second aspect or possible implementations of the second aspect, $P_T$ is a semi-static value configured by a network device, or $P_T$ is a preconfigured fixed value.

With reference to any one of the second aspect or possible implementations of the second aspect, the transmit power of the first data channel part satisfies the following formula:

$$P_1=\min\{P_{CMAX}-f(N,M-N), f(M-N)+P_O+\alpha \cdot PL, P_{MAX\_CBR}-f(N,M-N)\}$$

$P_1$ is the transmit power of the first data channel part, $P_{CMAX}$ is the maximum transmit power, f(N,M−N) is a function of the bandwidth M−N of the first data channel part and the bandwidth N of the control channel, f(M−N) is a function of the bandwidth M−N of the first data channel part, $P_O$ is a target received power of the second terminal device, PL is a reference link loss, and $P_{MAX\_CBR}$ is a power determined based on a channel busy degree.

With reference to any one of the second aspect or possible implementations of the second aspect, the transmit power of the second data channel part satisfies the following formula:

$$P_2=\min\{P_{CMAX}f(M)+P_O+\alpha \cdot PL, P_{MAX\_CBR}\}$$

$P_2$ is the transmit power of the second data channel part, $P_{CMAX}$ is the maximum transmit power, f(M) is a function of a bandwidth M of the second data channel part, $P_O$ is a target received power of the second terminal device, PL is a reference link loss, and $P_{MAX\_CBR}$ is a power determined based on a channel busy degree.

According to a third aspect, an embodiment of this application further provides a power control apparatus, including a processor, a memory, and a transceiver, where the processor is coupled to the memory, and the processor is configured to run instructions or programs in the memory. The processor is configured to determine a transmit power of a first data channel part and a transmit power of a second data channel part, where the first data channel part is a data channel part that overlaps a control channel in time domain and does not overlap the control channel in frequency domain, and the second data channel part is a data channel part that overlaps the control channel in frequency domain and does not overlap the control channel in time domain. The transceiver is coupled to the processor, and the transceiver is configured to: send data in the first data channel part to a second terminal device at the transmit power of the first data channel part, and send data in the second data channel part to the second terminal device at the transmit power of the second data channel part.

With reference to the third aspect, in a possible implementation, when a bandwidth of the control channel is N, and a bandwidth of a data channel is M, a bandwidth of the first data channel part is M−N, where M is greater than N. The transmit power of the first data channel part is determined based on a maximum transmit power, the bandwidth M−N of the first data channel part, and the bandwidth N of the control channel.

With reference to any one of the third aspect or possible implementations of the third aspect, the transmit power of the first data channel part satisfies the following formula:

$$P_1=\min\{P_{CMAX}-f(N,M-N), f(M-N)+P_O+\alpha \cdot PL\}$$

$P_1$ is the transmit power of the first data channel part, $P_{CMAX}$ is the maximum transmit power, f(N,M−N) is a function of the bandwidth M−N of the first data channel part and the bandwidth N of the control channel, f(M−N) is a function of the bandwidth M−N of the first data channel part, $P_O$ is a target received power of the second terminal device, and PL is a reference link loss.

With reference to any one of the third aspect or possible implementations of the third aspect, a ratio of the transmit power of the second data channel part to the transmit power of the first data channel part is positively correlated with a ratio of a bandwidth of the second data channel part to the bandwidth of the first data channel part.

With reference to any one of the third aspect or possible implementations of the third aspect, the transmit power of the second data channel part satisfies the following formula:

$$P_2=P_1+f(M/(M-N))$$

$P_2$ is the transmit power of the second data channel part, and f(M/(M−N)) is a function of a bandwidth M of the second data channel part and the bandwidth M−N of the first data channel part.

With reference to any one of the third aspect or possible implementations of the third aspect, the transmit power of the second data channel part is determined based on the maximum transmit power, and a link budget of the second data channel part, and the link budget of the second data channel part is determined based on a bandwidth M of the second data channel part.

With reference to any one of the third aspect or possible implementations of the third aspect, the transmit power of the second data channel part satisfies the following formula:

$$P_2=\min\{P_{CMAX}f(M)+P_O+\alpha \cdot PL\}$$

$P_2$ is the transmit power of the second data channel part, $P_{CMAX}$ is the maximum transmit power, f(M) is a function of the bandwidth M of the second data channel part, $P_O$ is the target received power of the second terminal device, and PL is the reference link loss.

With reference to any one of the third aspect or possible implementations of the third aspect, the reference link loss PL is determined based on an uplink/downlink transmission loss in a serving cell or a link transmission loss, and the link transmission loss includes a sidelink transmission loss; and the link transmission loss is a link loss from the first terminal device to the second terminal device; the link transmission loss is a largest value of link losses from the first terminal device to terminal devices that are in a first terminal device set; or the link transmission loss is a largest value of link losses from the first terminal device to terminal devices that are in a second terminal device set, where the second terminal device set belongs to the first terminal device set, and a first parameter of the terminal device in the second terminal device set satisfies a threshold range of the first parameter.

With reference to any one of the third aspect or possible implementations of the third aspect, the first parameter is any one of a reference signal received power RSRP, a signal to interference plus noise ratio SINR, a signal-to-noise ratio SNR, or a channel quality indicator CQI.

With reference to any one of the third aspect or possible implementations of the third aspect, the transceiver is further configured to receive indication information from a network device, where the indication information is used to indicate the transmit power of the second data channel part. The processor is specifically configured to determine, based on the indication information, that the transmit power of the second data channel part satisfies the formula $P_2 = P_1 + f(M/(M-N))$ or $P_2 = \min\{P_{CMAX}, f(M) + P_O + \alpha \cdot PL\}$, where $P_2$ is the transmit power of the second data channel part, $f(M/(M-N))$ is the function of the bandwidth M of the second data channel part and the bandwidth M-N of the first data channel part, $P_{CMAX}$ is the maximum transmit power, $f(M)$ is the function of the bandwidth M of the second data channel part, $P_O$ is the target received power of the second terminal device, and PL is the reference link loss.

With reference to any one of the third aspect or possible implementations of the third aspect, the transmit power of the first data channel part satisfies the following formula:

$$P_1 = \min\{P_{CMAX}, f(N, M-N), f(M-N) + P_O + \alpha \cdot PL, P_T, f(N, M-N)\}$$

$P_1$ is the transmit power of the first data channel part, $P_{CMAX}$ is the maximum transmit power, $f(N, M-N)$ is a function of the bandwidth M-N of the first data channel part and the bandwidth N of the control channel, $f(M-N)$ is a function of the bandwidth M-N of the first data channel part, $P_O$ is a target received power of the second terminal device, PL is a reference link loss, and $P_T$ is a transmit power positively correlated with a priority of a service carried by data sent on the data channel.

With reference to any one of the third aspect or possible implementations of the third aspect, the transmit power of the second data channel part satisfies the following formula:

$$P_2 = \min\{P_{CMAX}, f(M) + P_O + \alpha \cdot PL, P_T\}$$

$P_2$ is the transmit power of the second data channel part, $P_{CMAX}$ is the maximum transmit power, $f(M)$ is a function of a bandwidth M of the second data channel part, $P_O$ is a target received power of the second terminal device, PL is a reference link loss, and $P_T$ is a transmit power positively correlated with a priority of a service carried by data sent on the data channel.

With reference to any one of the third aspect or possible implementations of the third aspect, $P_T$ is a semi-static value configured by a network device, or $P_T$ is a preconfigured fixed value.

With reference to any one of the third aspect or possible implementations of the third aspect, the transmit power of the first data channel part satisfies the following formula:

$$P_1 = \min\{P_{CMAX}, f(N, M-N), f(M-N) + P_O + \alpha \cdot PL, P_{MAX\_CBR}, f(N, M-N)\}$$

$P_1$ is the transmit power of the first data channel part, $P_{CMAX}$ is the maximum transmit power, $f(N, M-N)$ is a function of the bandwidth M-N of the first data channel part and the bandwidth N of the control channel, $f(M-N)$ is a function of the bandwidth M-N of the first data channel part, $P_O$ is a target received power of the second terminal device, PL is a reference link loss, and $P_{MAX\_CBR}$ is a power determined based on a channel busy degree.

With reference to any one of the third aspect or possible implementations of the third aspect, the transmit power of the second data channel part satisfies the following formula:

$$P_2 = \min\{P_{CMAX}, f(M) + P_O + \alpha \cdot PL, P_{MAX\_CBR}\}$$

$P_2$ is the transmit power of the second data channel part, $P_{CMAX}$ is the maximum transmit power, $f(M)$ is a function of a bandwidth M of the second data channel part, $P_O$ is a target received power of the second terminal device, PL is a reference link loss, and $P_{MAX\_CBR}$ is a power determined based on a channel busy degree.

According to a fourth aspect, an embodiment of this application provides a computer-readable storage medium. The computer-readable storage medium stores instructions; and when the instructions are run on a computer, the computer is enabled to perform the method according to the foregoing aspects.

According to a fifth aspect, an embodiment of this application provides a computer program product including instructions; and when the computer program product runs on a computer, the computer is enabled to perform the method according to the foregoing aspects.

DETAILED DESCRIPTION OF ILLUSTRATIVE EMBODIMENTS

The following describes embodiments of this application with reference to the accompanying drawings in the embodiments of this application.

In the specification, claims, and accompanying drawings of this application, the terms "first", "second", and the like are intended to distinguish between different objects but do not indicate a particular order. In addition, the terms "including", "having", or any other variant thereof, are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

It should be understood that, in this application, the term "at least one (item)" means one or more, the term "a plurality of" means two or more than two, "at least two (items) means two, three, or more than three, and the term "and/or" is used to describe an association relationship for describing associated objects and represent that three relationships may exist. For example, "A and/or B" may represent three cases: Only A exists, only B exists, and both A and B exists. A and B may be singular or plural. The character "/" usually indicates an "or" relationship between the associated objects. "At least one of the following items (pieces)" or a similar expression thereof indicates any combination of these items, including any combination of singular items (pieces) or plural items (pieces). For example, at least one item (piece) of a, b, or c may represent: a, b, c, "a and b", "a and c", "b and c", or "a, b, and c", where a, b, and c may be singular or plural.

Figure 1A:
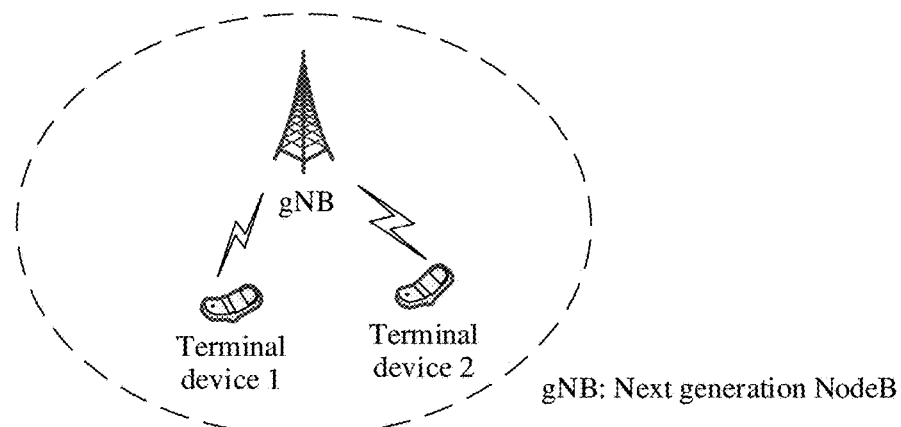
FIG. 1a is a schematic structural diagram of a communications system according to an embodiment of this application.

A communications system used in this application may be understood as a wireless cellular communications system, or may be understood as a wireless communications system based on a cellular network architecture. For example, the communications system may be a 5th generation mobile communications (5G) system and next generation mobile communications system. FIG. 1a is a schematic diagram of a communications system according to an embodiment of this application. The solution in this application may be applied to the communications system. The communications system may include at least one network device, and only one network device is shown, for example, a next generation NodeB (the next generation Node B, gNB) in the figure. The communications system may further include one or more terminal devices connected to the network device, for example, a terminal device 1 and a terminal device 2 in the figure.

The network device may be a device that can communicate with the terminal device. The network device may be any device with a wireless transceiver function, and includes but is not limited to a base station. For example, the base station may be the gNB, or the base station may be a base station in a future communications system. Optionally, the network device may alternatively be an access node, a wireless relay node, a wireless backhaul node, or the like in a wireless local area network (e.g. wireless fidelity, WiFi) system. Optionally, the network device may alternatively be a radio controller in a cloud radio access network (cloud radio access network, CRAN) scenario. Optionally, the network device may alternatively be a wearable device, a vehicle-mounted device, or the like. Optionally, the network device may alternatively be a small cell, a transmission node (transmission reference point, TRP), or the like. Certainly, this application is not limited thereto.

The terminal device may also be referred to as user equipment (user equipment, UE), a terminal, or the like. The terminal device is a device with a wireless transceiver function. The terminal device may be deployed on land, and includes an indoor device, an outdoor device, a handheld device, a wearable device, or a vehicle-mounted device; or may be deployed on water, for example, on a ship; or may be deployed in air, for example, on an airplane, a balloon, or a satellite. The terminal device may be a mobile phone, a tablet (e.g. Pad), a computer with a wireless transceiver function, a virtual reality (VR) terminal device, an augmented reality (AR) terminal device, a wireless terminal in industrial control (industrial control), a wireless terminal in self-driving, a wireless terminal in telemedicine (also called remote medical surgery), a wireless terminal in a smart grid, a wireless terminal in transportation safety, a wireless terminal in a smart city, a wireless terminal in a smart home, or the like.

It may be understood that, in the communications system shown in FIG. 1a, the terminal device 1 and the terminal device 2 may alternatively communicate with each other by using a device-to-device (D2D) technology or a vehicle-to-anything (V2X) communications technology.

Long term evolution (LTE)-V2X satisfies some basic requirements in a V2X scenario, but the currently LTE V2X cannot be effectively applied to future scenarios such as fully intelligent driving and autonomous driving. With the development of a 5th generation (5G) mobile communications new radio (NR) technology in the 3GPP standards organization, 5G NR-V2X will also be further developed, for example, can support a lower transmission latency, more reliable communication transmission, a higher throughput, and better user experience, to satisfy the requirements of a wider range of application scenarios. Therefore, NR-V2X proposes to support transmission with reliability of 99.99% or even 99.999%. In addition, to satisfy different service requirements, the NR-V2X also needs to support unicast, multicast, and broadcast services, and the like.

Figure 1B:
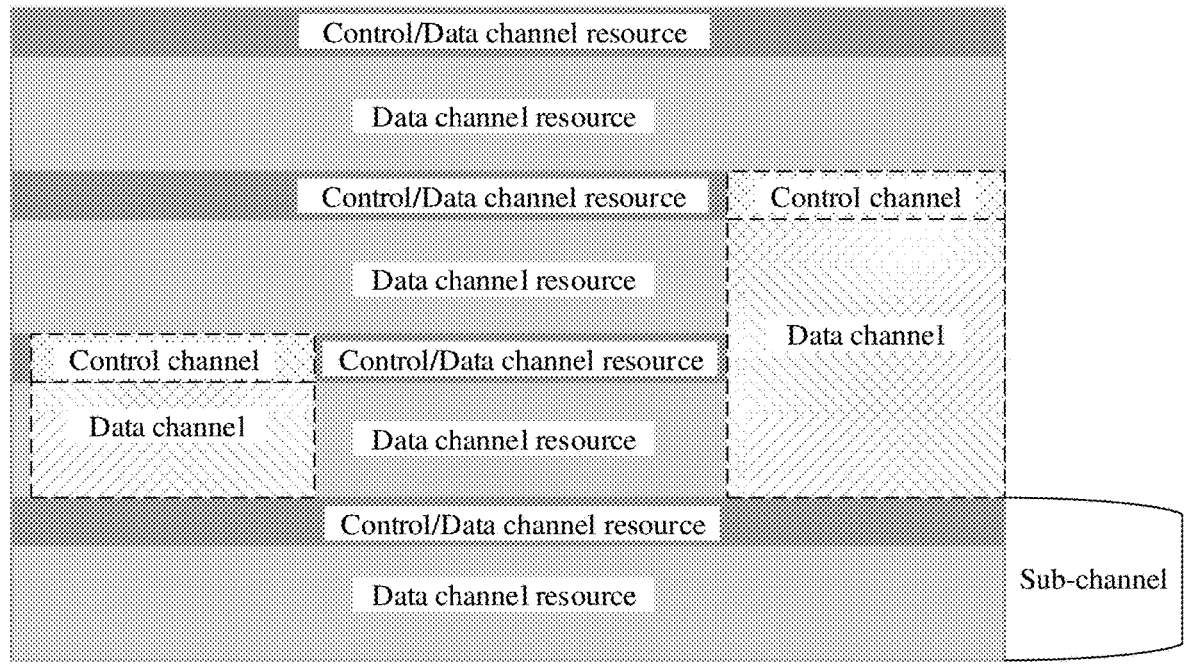
FIG. 1b is a schematic structural diagram of a data channel and a control channel.

A resource diagram shown in FIG. 1B is used as an example, a control channel and a data channel are frequency division multiplexed together on a time-frequency resource that is sent once. From the perspective of time domain, the control channel and the data channel are in a coexistence relationship. Therefore, transmit powers of the control channel and the data channel need to be considered together. In a network device (for example, the base station) scheduling mode, power control in LTE-V2X may satisfy the following formula:

$$P_{PSSCH} = 10\log_{10}\left(\frac{M_{PSSCH}}{M_{PSSCH} + 10^{\frac{3}{10}} \times M_{PSCCH}}\right) + \min\{P_{CMAX}, 10\log_{10}(M_{PSSCH} + 10^{\frac{3}{10}} \times M_{PSCCH}) + P_{O\_PSSCH,3} + \alpha_{PSSCH,3} \cdot PL\}[dBm] \quad (1)$$

$$P_{PSCCH} = 10\log_{10}\left(\frac{10^{\frac{3}{10}} \times M_{PSCCH}}{M_{PSSCH} + 10^{\frac{3}{10}} \times M_{PSCCH}}\right) + \min\{P_{CMAX}, 10\log_{10}(M_{PSSCH} + 10^{\frac{3}{10}} \times M_{PSCCH}) + P_{O\_PSSCH,3} + \alpha_{PSSCH,3} \cdot PL\}[dBm] \quad (2)$$

$P_{PSSCH}$ is the transmit power of the data channel, $P_{PSCCH}$ is the transmit power of the control channel, $M_{PSSCH}$ is a bandwidth of the data channel, $M_{PSCCH}$ is a bandwidth of the control channel, and $P_{CMAX}$ is a maximum transmit power, or may be understood as a maximum transmit power allowed by the terminal device. PL is a downlink link power loss of the terminal device. In a communications system, especially in a time division duplex (time division duplexing, TDD) system, it is usually considered that uplink and downlink losses are consistent. Therefore, PL may be used to indicate a possible link loss from the terminal device to a base station side. $P_{O\_PSSCH\_3}$ is a power expected to be received by the terminal device (which may also be understood as a target received power of the terminal device). 3 indicates base station scheduling, $\alpha_{PSSCH,3}$ is a filtering parameter configured in a base station scheduling mode.

The foregoing formula (1) may change to:

$$P_{PSSCH} = \min\left\{P_{CMAX} - 10\log_{10}\left(1 + \frac{10^{\frac{3}{10}} \times M_{PSCCH}}{M_{PSSCH}}\right), 10\log_{10}(M_{PSSCH}) + P_{O\_PSSCH,3} + \alpha_{PSSCH,3} \cdot PL\right\}[dBm] \quad (3)$$

The foregoing formula (2) may change to:

$$P_{PSCCH} = \min\left\{P_{CMAX} - 10\log_{10}\left(1 + \frac{M_{PSSCH}}{10^{\frac{3}{10}} \times M_{PSCCH}}\right), 10\log_{10}(10^{\frac{3}{10}} \times M_{PSCCH}) + P_{O\_PSSCH,3} + \alpha_{PSSCH,3} \cdot PL\right\}[dBm] \quad (4)$$

The formula (3) and the formula (4) each include two sub-items, where the first item indicates a maximum transmit power allocated to a current channel. For example, the first item in the formula (3) may indicate a maximum transmit power allocated to the data channel. The first item in the formula (4) may indicate a maximum transmit power allocated to the control channel. It can be learned from the first item that, the maximum transmit powers allocated to the control channel and the data channel are in direct proportion to the bandwidths of the channels. In addition, compared with the data channel, each sub-channel of the control channel has an increase of $10^{3/10}$ times in a transmit power. In other words, all transmit powers allowed by hardware of the terminal device are allocated to the control channel and the data channel in proportion to the bandwidths.

The second item indicates a link budget, that is, an expected transmit power of a link, calculated based on a link loss of a Uu interface and an expected signal-to-noise ratio (signal-noise-ratio, SNR). Finally, the transmit power of the data channel and the transmit power of the control channel are respectively minimum values in the first item and the second item. In other words, when the transmit power allowed by the terminal device is sufficiently large, a data channel is sent based on a link requirement (that is, the link budget). When the power allowed by the terminal device is less than the link requirement, a data channel is sent at the maximum power allowed by the terminal device.

Further, in a contention mode, power control in LTE-V2X for sending a data channel may satisfy the following formula:

$$P_{PSSCH} = 10\log_{10}\left(\frac{M_{PSSCH}}{M_{PSSCH} + 10^{\frac{3}{10}} \times M_{PSCCH}}\right) + A \quad (5)$$

A system may define a maximum transmit power $P_{MAX\_CBR}$ in a sub-channel based on a busy degree of the current sub-channel. If a quantity of terminal devices in the sub-channel is relatively large, to reduce a collision probability, a transmit power of each terminal device in the sub-channel may be reduced. Otherwise, a transmit power of each terminal device in the sub-channel may be increased. When the system configures $P_{MAX\_CBR}$, A may satisfy the following formula:

$$A = \min\{P_{CMAX}, P_{MAX\_CBR}, 10\log_{10}(M_{PSSCH} + 10^{\frac{3}{10}} \times M_{PSCCH}) + P_{O\_PSSCH,4} + \alpha_{PSSCH,4} \cdot PL\} \quad (6)$$

In a contention mode, power control in LTE-V2X for sending a control channel may satisfy the following formula:

$$P_{PSCCH} = 10\log_{10}\left(\frac{10^{\frac{3}{10}} \times M_{PSCCH}}{M_{PSSCH} + 10^{\frac{3}{10}} \times M_{PSCCH}}\right) + B \quad (7)$$

B may satisfy the following formula:

$$B = \min\{P_{CMAX}, P_{MAX\_CBR}, 10\log_{10}(M_{PSSCH} + 10^{\frac{3}{10}} \times M_{PSCCH}) + P_{O\_PSSCH,4} + \alpha_{PSSCH,4} \cdot PL\} \quad (8)$$

Figure 2:
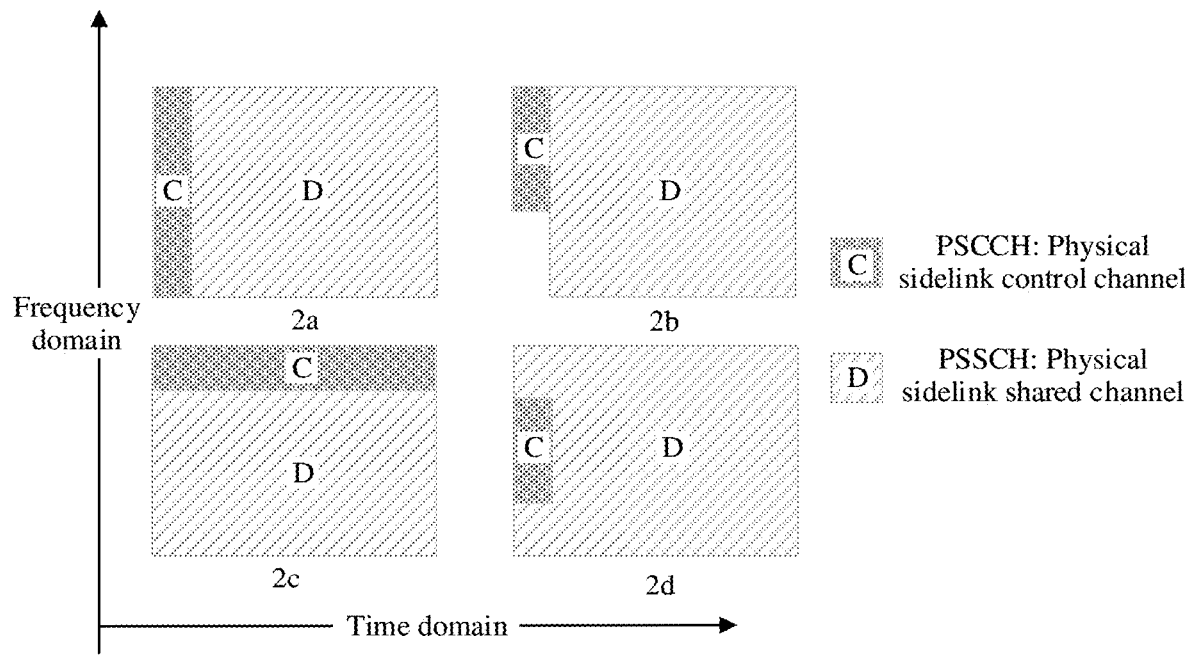
FIG. 2 is a schematic diagram of four frame structures.

The foregoing describes the power control method in an LTE-V2X scenario. However, a possible frame structure in an NR-V2X scenario is shown in FIG. 2. LTE-V2X and device-to-device (device to device, D2D) power allocation manners and LTE-V2X and device-to-device power control methods are only applicable to 2a, 2b, and 2c in FIG. 2. If a structure shown in 2d in FIG. 2 appears in the frame structure in the NR-V2X, to be specific, a hybrid multiplexing scenario in which the control channel overlaps the data channel in both time domain and frequency domain, the LTE-V2X or D2D power allocation manner is no longer applicable. Therefore, for the power control method of the structure shown in 2d in FIG. 2, refer to the method shown in FIG. 4 in the embodiments of this application.

The following uses the terminal device 1 and the terminal device 2 in the NR-V2X as examples to specifically describe communication scenarios of the power control method provided in the embodiments of this application.

FIG. 3a to FIG. 3g each are a schematic diagram of a sidelink communication scenario according to an embodiment of this application.

Figure 3A:
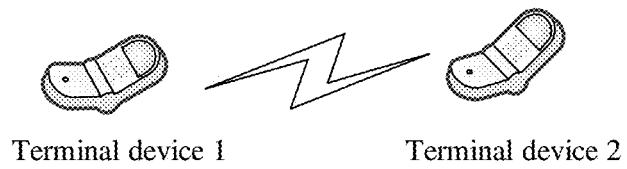
FIG. 3a is a schematic diagram of a sidelink communication scenario according to an embodiment of this application.

In the scenario shown in FIG. 3a, both the terminal device 1 and the terminal device 2 are outside coverage of a cell.

Figure 3B:
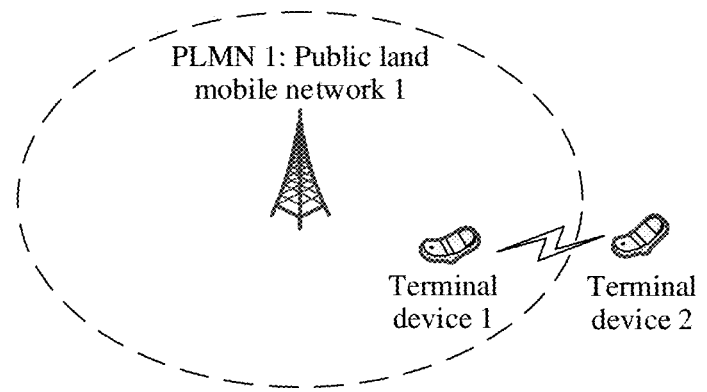
FIG. 3b is a schematic diagram of another sidelink communication scenario according to an embodiment of this application.

In the scenario shown in FIG. 3b, the terminal device 1 is in coverage of a cell, and the terminal device 2 is outside the coverage of the cell.

Figure 3C:
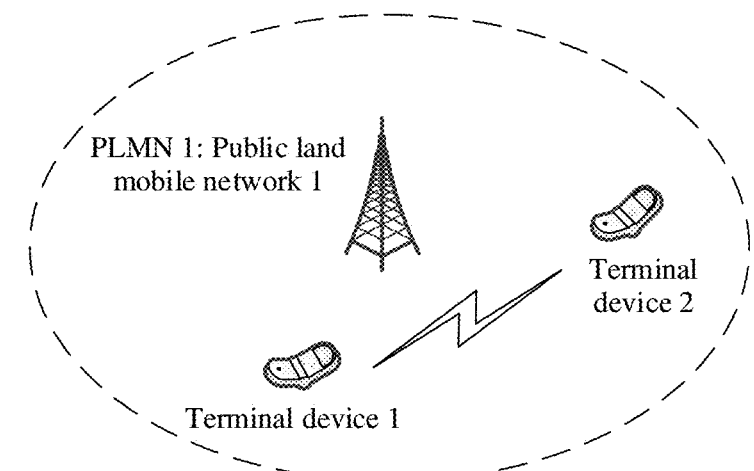
FIG. 3c is a schematic diagram of still another sidelink communication scenario according to an embodiment of this application.

In the scenario shown in FIG. 3c, both the terminal device 1 and the terminal device 2 are in coverage of a same cell, and are in a public land mobile network (public land mobile network, PLMN), for example, a PLMN 1.

Figure 3D:
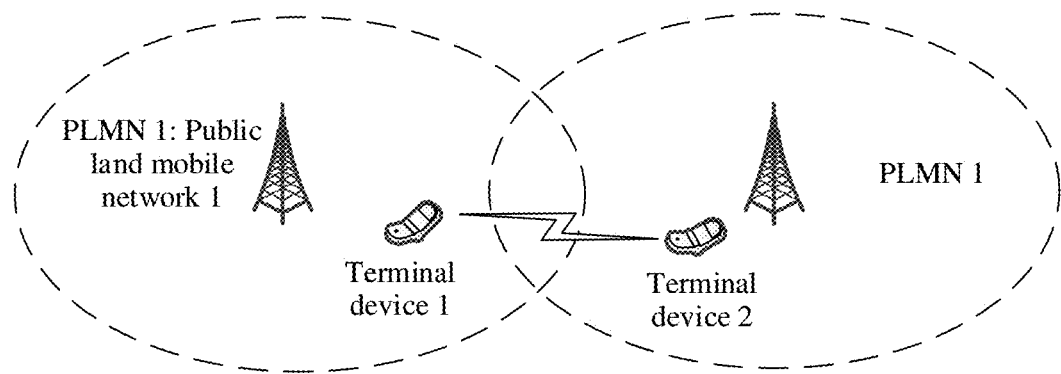
FIG. 3d is a schematic diagram of still another sidelink communication scenario according to an embodiment of this application.

In the scenario shown in FIG. 3d, the terminal device 1 and the terminal device 2 are in one PLMN, for example, a PLMN 1, but are in coverage of different cells.

Figure 3E:
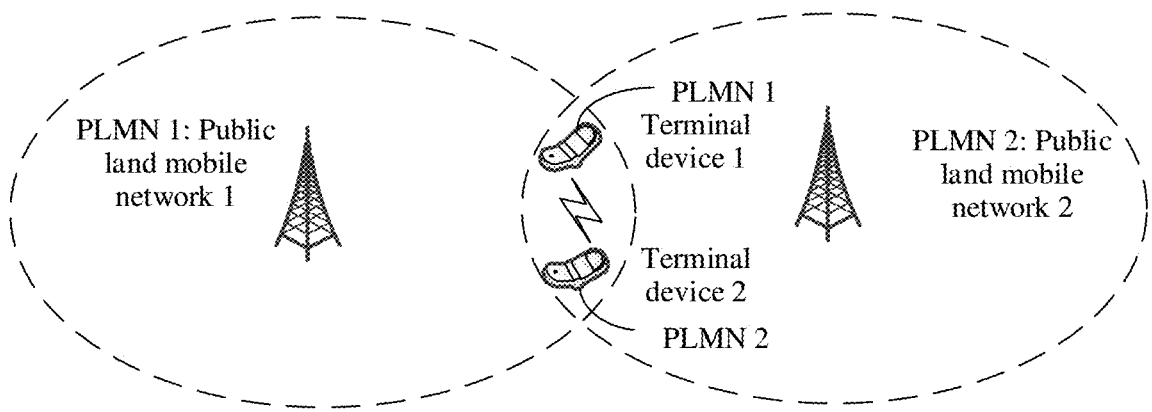
FIG. 3e is a schematic diagram of still another sidelink communication scenario according to an embodiment of this application.

In the scenario shown in FIG. 3e, the terminal device 1 and the terminal device 2 are respectively in different PLMNs and different cells, and the terminal device 1 and the terminal device 2 are in co-coverage of two cells. For example, the terminal device 1 is in a PLMN 1, and the terminal device 2 is in a PLMN 2.

Figure 3F:
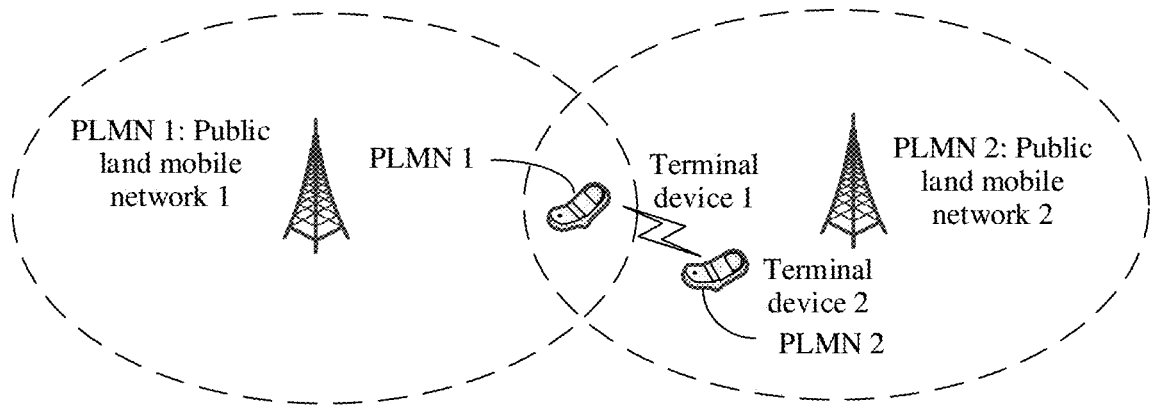
FIG. 3f is a schematic diagram of still another sidelink communication scenario according to an embodiment of this application.

In the scenario shown in FIG. 3f, the terminal device 1 and the terminal device 2 are respectively in different PLMNs and different cells, the terminal device 1 is in co-coverage of two cells, and the terminal device 2 is in coverage of a serving cell.

Figure 3G:
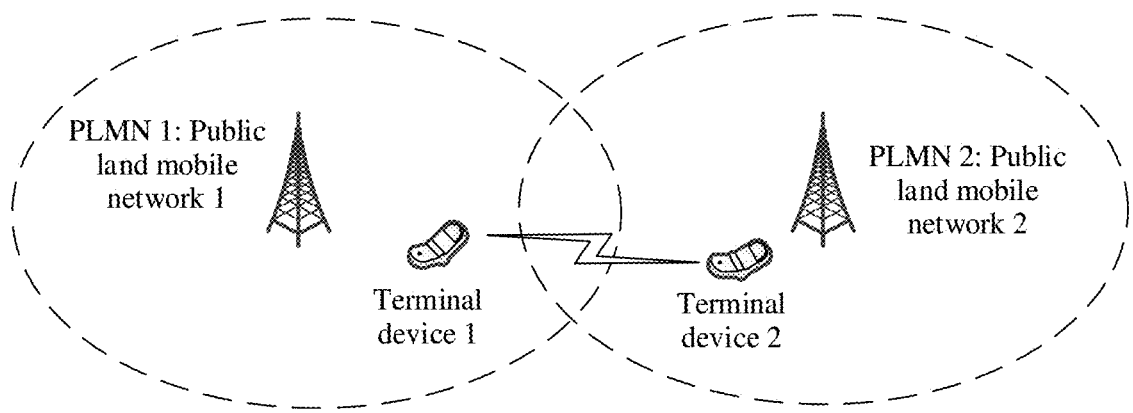
FIG. 3g is a schematic diagram of still another sidelink communication scenario according to an embodiment of this application.

In the scenario shown in FIG. 3g, the terminal device 1 and the terminal device 2 are respectively in different PLMNs and different cells, and the terminal device 1 and the terminal device 2 are respectively in coverage of serving cells of the terminal device 1 and the terminal device 2.

It may be understood that the foregoing scenarios may be applied to vehicle-to-everything (vehicle-to-everything, V2X), which may also be referred to as V2X.

Figure 4:
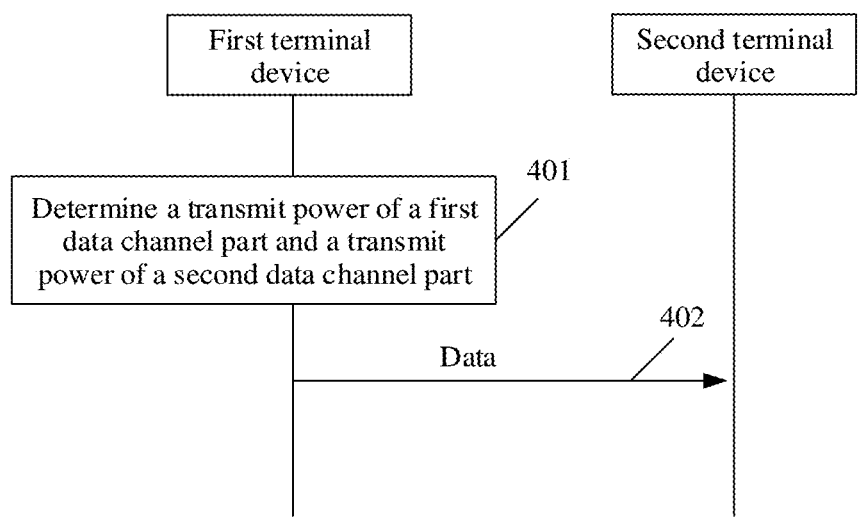
FIG. 4 is a schematic flowchart of a power control method according to an embodiment of this application.

FIG. 4 is a schematic flowchart of a power control method according to an embodiment of this application. The power control method may be applied to the terminal devices shown in FIG. 3a to FIG. 3g, and the power control method can effectively resolve the foregoing power control problem. As shown in FIG. 4, the power control method may include the following steps.

401: A first terminal device determines a transmit power of a first data channel part and a transmit power of a second data channel part.

The first data channel part is a data channel part that overlaps a control channel in time domain and does not overlap the control channel in frequency domain, and the second data channel part is a data channel part that overlaps the control channel in frequency domain and does not overlap the control channel in time domain.

Figure 5A:
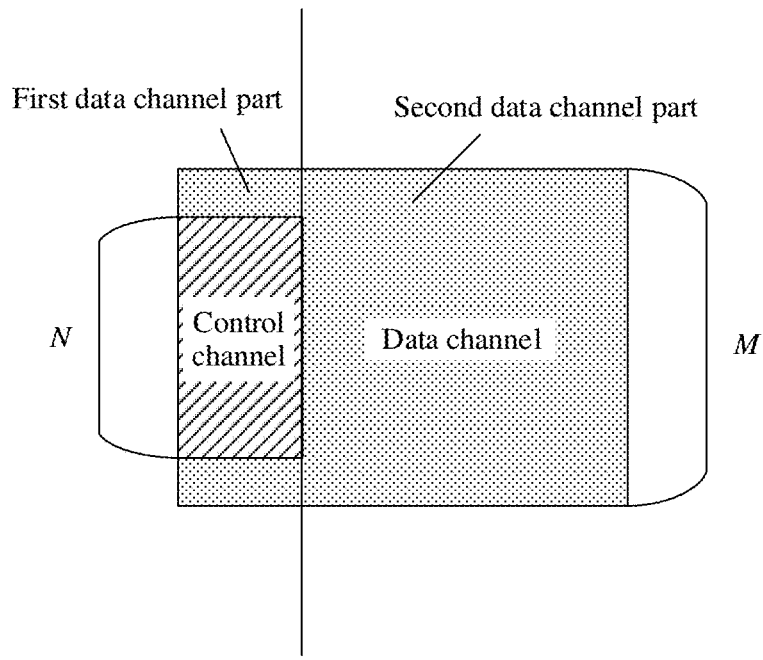
FIG. 5a is a schematic diagram of a data channel and a control channel according to an embodiment of this application.
Figure 5B:
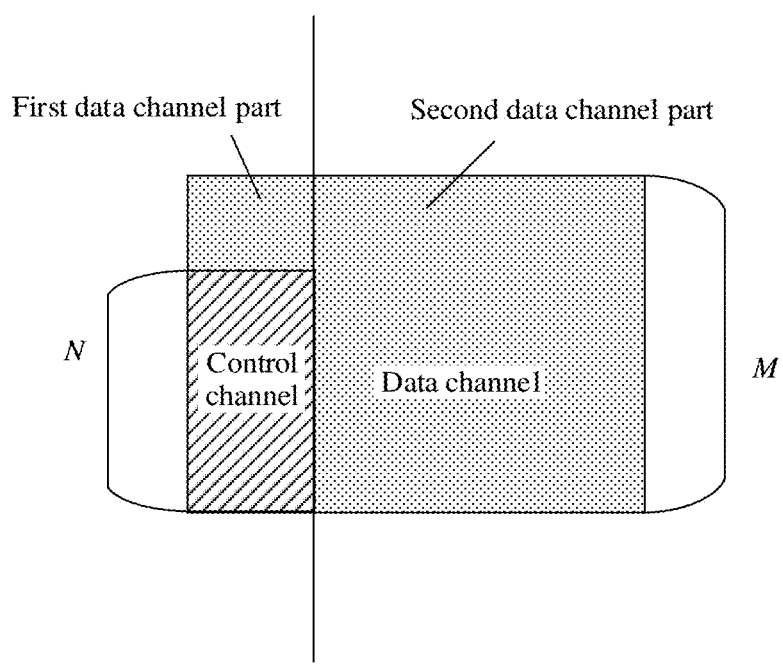
FIG. 5b is a schematic diagram of another data channel and control channel according to an embodiment of this application.
Figure 5C:
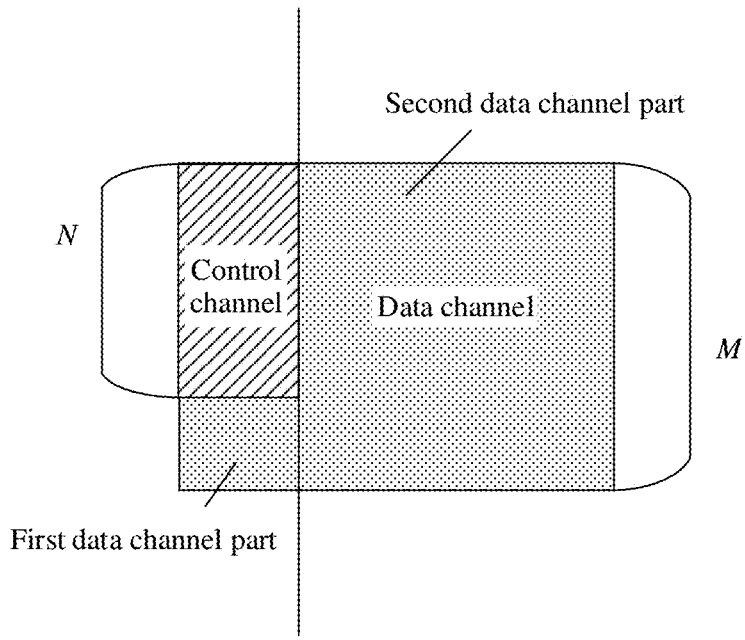
FIG. 5c is a schematic diagram of still another data channel and control channel according to an embodiment of this application.
Figure 5D:
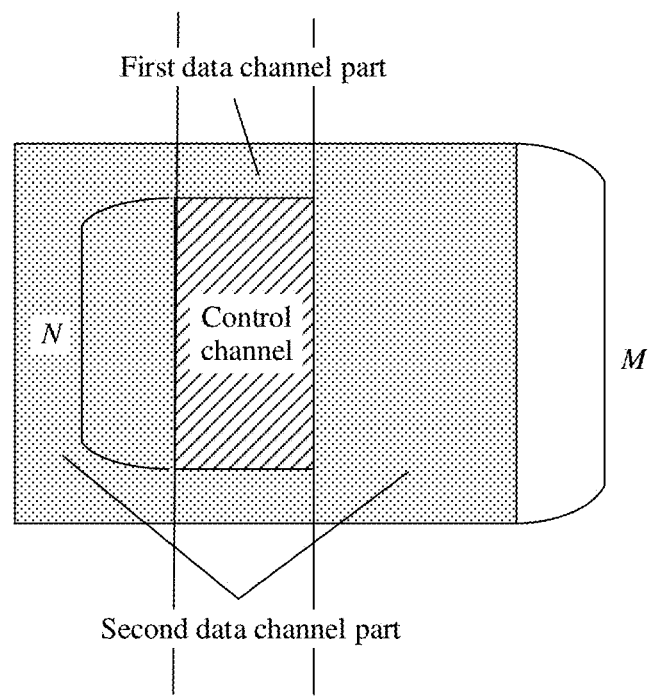
FIG. 5d is a schematic diagram of still another data channel and control channel according to an embodiment of this application.
Figure 5E:
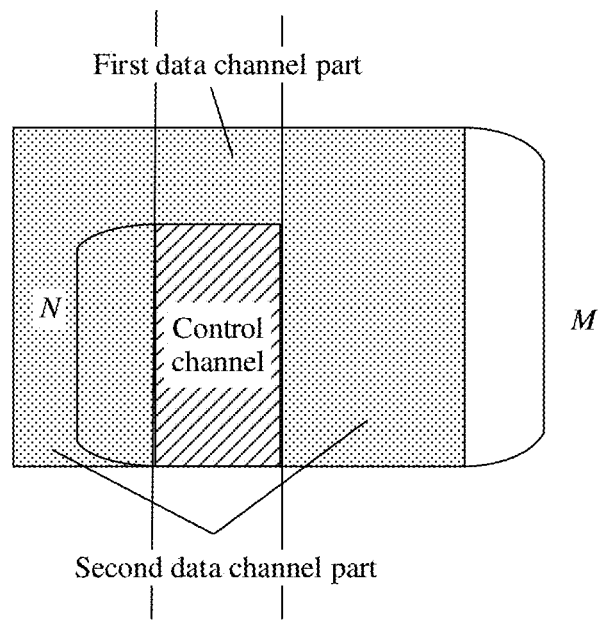
FIG. 5e is a schematic diagram of still another data channel and control channel according to an embodiment of this application.
Figure 5F:
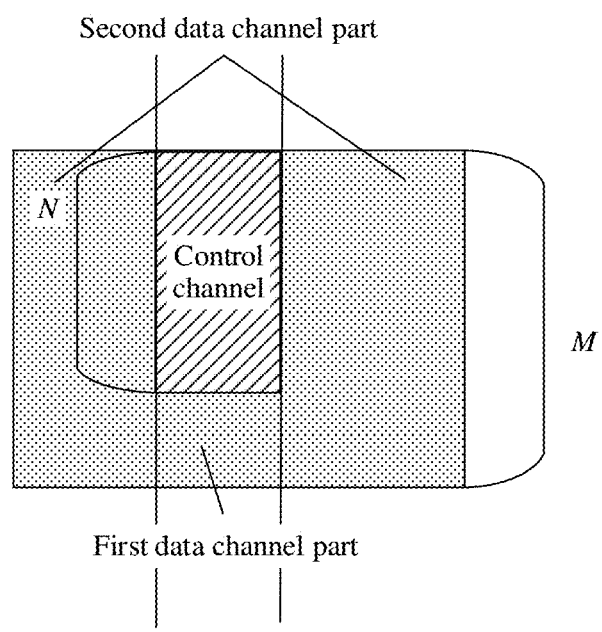
FIG. 5f is a schematic diagram of still another data channel and control channel according to an embodiment of this application.

To better understand the first data channel part and the second data channel part that are described in this embodiment of this application, FIG. 5a provides a schematic diagram of a data channel and a control channel. As shown in FIG. 5a, the data channel may be divided into a first data channel part and a second data channel part. In other words, the first data channel part and the second data channel part may form a complete data channel. Alternatively, the first data channel part and the second data channel part may constitute a complete data channel. The first data channel part overlaps the control channel in time domain but does not overlap the control channel in frequency domain, and the second data channel part overlaps the control channel in frequency domain but does not overlap the control channel in time domain. In other words, the first data channel part and the control channel are time domain multiplexed, but are not frequency domain multiplexed, and the second data channel part and the control channel are frequency domain multiplexed, but are not time domain multiplexed.

In an example, if a bandwidth of the data channel is M, a bandwidth of the control channel is N, and M is greater than N, a bandwidth of the first data channel part is M−N, and a bandwidth of the second data channel part is M. It may be understood that, M may indicate M resource blocks (resource block, RB), and N may indicate N RBs. Possibly, the bandwidth of the data channel and the bandwidth of the control channel may be in units of subcarriers, or the like. This is not limited in this application. It may be understood that, when a subcarrier is used as a unit, the transmit power of the first data channel part, the transmit power of the second data channel part, and a transmit power of the control channel further need to be determined based on a subcarrier spacing.

In an example, the control channel may be understood as a channel used to carry sidelink control information (sidelink control information, SCI), and the SCI includes decoding information of data transmitted on the data channel, and the like. The data channel may be understood as a channel used to carry data. For example, the data may be data sent by the first terminal device to a second terminal device. Further, the data may be used to carry service data sent by the first terminal device to the second terminal device. For example, a sidelink data channel may be a physical sidelink shared channel (physical sidelink shared channel, PSSCH), and a sidelink control channel may be a physical sidelink control channel (physical sidelink control channel, PSCCH).

Further, for the schematic diagram of the data channel and the control channel, refer to schematic diagrams shown in FIG. 5b to FIG. 5f. Details are not described herein again.

In this embodiment of this application, when determining a transmit power, a terminal device (for example, the first terminal device) may divide the data channel into two parts, and separately determine transmit powers of the two parts, to be specific, the transmit power of the first data channel part and the transmit power of the second data channel part. The following describes a detailed process in which the first terminal device determines the transmit power of the first data channel part and the transmit power of the second data channel part.

402: The first terminal device sends data in the first data channel part to the second terminal device at the transmit power of the first data channel part, and sends data in the second data channel part to the second terminal device at the transmit power of the second data channel part.

In this embodiment of this application, power control may be performed differently on different data channel parts by distinguishing between the first data channel part and the second data channel part. For example, the data in the first data channel part and the data in the second data channel part may be sent at different transmit powers. This avoids sending of data at a same transmit power in all cases, thereby avoiding a waste of resources. For example, this avoids a case in which the transmit power of the first data channel part or the second data channel part is excessively high when the transmit power of the data channel is determined based on a same manner, and actually, data can be sent without the excessively high transmit power. In this case, the data channel is divided into two parts, and transmit powers of the two parts are determined respectively. This can satisfy power requirements of different data channel parts, avoid sending data at the same transmit power in all cases which causes the excessively high transmit power of the first data channel part or the second data channel part and causes interference to another terminal device, further reduce the interference to the another terminal device, and improve system performance.

Then, how the first terminal device determines the transmit power of the control channel, the transmit power of the first data channel part, and the transmit power of the second data channel part is described in detail. It may be understood that, the following uses the schematic diagram of the control channel and the data channel shown in FIG. 5a for description.

1. Transmit Power of the Control Channel:

In some embodiments of this application, the first terminal device may determine the transmit power of the control channel based on a maximum transmit power $P_{CMAX}$, the bandwidth M–N of the first data channel part, and the bandwidth N of the control channel. More specifically, the transmit power of the control channel may satisfy the following formula:

$$P_{control} = \min\{P_{CMAX} - f(M-N,N), f(N) + P_O + \alpha \cdot PL\} \text{ [dBm]} \quad (9)$$

$P_{control}$ is the transmit power of the control channel, $P_{CMAX}$ is the maximum transmit power, f(M–N,N) is a function of the bandwidth M–N of the first data channel part and the bandwidth N of the control channel, f(N) is a function of the bandwidth N of the control channel, $P_O$ is a target received power of the second terminal device (which may also be understood as a received power expected by the second terminal device), α is a filtering parameter specified (by a base station) for considering to adjust stability, and may be configured by a higher layer, and PL is a reference link loss. For a specific description of PL, refer to the following. Details are not described herein. Specifically, $P_{CMAX}$ may be understood as a maximum transmit power limited by physical hardware, or may be understood as a maximum transmit power allowed by hardware of the terminal device. Optionally, $P_{CMAX}$ may be configured by using higher layer signaling of the base station.

It may be understood that, f(M–N,N) in the formula (9) may also be understood as an expression of the bandwidth M–N of the first data channel part and the bandwidth N of the control channel, or may be understood as a relational expression between the bandwidth M–N of the first data channel part and the bandwidth N of the control channel, or the like.

For the formula (9), $P_{CMAX}$–f(M–N,N) may be understood as a transmit power allocated to the control channel based on the maximum transmit power $P_{CMAX}$ and a ratio of the bandwidth of the control channel to the bandwidth of the first data channel part, and f(N)+$P_O$+α·PL may be understood as a link budget of the control channel.

Specifically, f(M–N,N) may satisfy the following formula:

$$f(M-N,N) = 10\log_{10}\left(1 + \frac{M-N}{10^{\frac{3}{10}} \times N}\right) \text{[dBm]} \quad (10)$$

In other words, because the control channel overlaps the first data channel part in time domain but does not overlap the first data channel part in frequency domain, the control channel and the first data channel part send control information and data at a same moment. Therefore, power allocation needs to be performed for the control channel and the first data channel part. Therefore, f(M–N,N) may be understood as a power allocation relationship between the control channel and the first data channel part.

Specifically, f(N) may satisfy the following formula:

$$f(N) = 10\log_{10}\left(10^{\frac{3}{10}} \times N\right) \text{[dBm]} \quad (11)$$

Further, with reference to the formula (10) and the formula (11), the transmit power of the control channel may satisfy the following formula:

$$P_{control} = \min\left\{P_{CMAX} - 10\log_{10}\left(1 + \frac{M-N}{10^{\frac{3}{10}} \times N}\right), \right. \quad (12)$$
$$\left. 10\log_{10}\left(10^{\frac{3}{10}} \times N\right) + P_O + \alpha \cdot PL\right\} \text{[dBm]}$$

Alternatively, this embodiment further provides another form to indicate a formula that the transmit power of the control channel satisfies, as shown in the following:

$$P_{control} = 10\log_{10}\left(\frac{10^{\frac{3}{10}} \times N}{M-N+10^{\frac{3}{10}} \times N}\right) + \quad (13)$$
$$\min\left\{P_{CMAX}, 10\log_{10}\left(M-N+10^{\frac{3}{10}} \times N\right) + P_O + \alpha \cdot PL\right\} \text{[dBm]}$$

It may be understood that the formula (12) and the formula (13) are two different forms of the transmit power of the control channel in a base station scheduling mode. When the first terminal device needs to determine the transmit power of the control channel, regardless of whether the formula (12) or the formula (13) is used, results of transmit powers, of the control channel, determined by the first terminal device are consistent. Therefore, the first terminal device may alternatively determine the transmit power of the control channel by using the formula (9) and further by using the formula (12) or the formula (13), so that the first terminal device sends control information on the control channel to the second terminal device at the transmit power of the control channel.

The formula (9), the formula (12), and the formula (13) that the control channel shown above satisfies are shown in the base station scheduling mode. However, in a contention mode, because each sub-channel has a busy power control setting, in some embodiments of this application, the transmit power of the control channel may satisfy the following formula:

$$P_{control} = \min\{P_{CMAX} - f(M-N,N), f(N) + P_O + \alpha \cdot PL, P_{MAX\_CBR} - f(M-N,N)\}[dBm] \quad (14)$$

$P_{control}$ is the transmit power of the control channel, $P_{CMAX}$ is the maximum transmit f(M–N,N) is the function of the bandwidth M–N of the first data channel part and the bandwidth N of the control channel, f(N) is the function of the bandwidth N of the control channel, $P_O$ is the target received power of the second terminal device, $\alpha$ is the filtering parameter specified for considering to adjust stability, and may be configured by the higher layer, PL is the reference link loss, and $P_{MAX\_CBR}$ is a power determined based on a channel busy degree (e.g. max channel busy ratio), or may be understood as a busy power.

Further, with reference to the formula (10) and the formula (11), in the contention mode, the transmit power of the control channel may satisfy the following formula:

$$P_{control} = \min\left\{P_{CMAX} - 10\log_{10}\left(1 + \frac{M-N}{10^{\frac{3}{10}} \times N}\right), 10\log_{10}\left(10^{\frac{3}{10}} \times N\right) + P_O + \alpha \cdot PL, P_{MAX\_CBR} - 10\log_{10}\left(1 + \frac{M-N}{10^{\frac{3}{10}} \times N}\right)\right\}[dBm] \quad (15)$$

Alternatively, in the contention mode, the transmit power of the control channel satisfies the following formula:

$$P_{control} = 10\log_{10}\left(\frac{10^{\frac{3}{10}} \times N}{M - N + 10^{\frac{3}{10}} \times N}\right) + \min\left\{P_{CMAX}, 10\log_{10}\left(M - N + 10^{\frac{3}{10}} \times N\right) + P_O + \alpha \cdot PL, P_{MAX\_CBR}\right\}[dBm] \quad (16)$$

It may be understood that the formula (15) and the formula (16) are two different forms of the transmit power of the control channel, and transmit powers, of the control channel, determined by the first terminal device by using the formula (15) and the formula (16) are consistent.

When the control information is sent through the control channel, different control information may include different priorities. Therefore, in some embodiments of this application, determining the transmit power of the control channel may be further based on a priority of the control information. For example, the transmit power of the control channel satisfies the following formula:

$$P_{control} = \min\{P_{CMAX} - f(M-N,N), f(N) + P_O + \alpha \cdot PL, P_T - f(M-N,N)\}[dBm] \quad (17)$$

$P_T$ is a transmit power positively correlated with the priority of the control information that is sent on the control channel. $P_T$ is a semi-static value configured by a network device, or $P_T$ is a preconfigured fixed value. It may be understood that for descriptions of other parameters, refer to other examples. Details are not described herein. When $P_T$ is a preconfigured fixed value, $P_T$ may be configured by using higher layer signaling, for example, configured by using higher layer signaling of the network device.

With reference to the formula (10) and the formula (11), the transmit power of the control channel may satisfy the following formula:

$$P_{control} = \min\left\{P_{CMAX} - 10\log_{10}\left(1 + \frac{M-N}{10^{\frac{3}{10}} \times N}\right), 10\log_{10}\left(10^{\frac{3}{10}} \times N\right) + P_O + \alpha \cdot PL, P_T - 10\log_{10}\left(1 + \frac{M-N}{10^{\frac{3}{10}} \times N}\right)\right\}[dBm] \quad (18)$$

It may be understood that, for specific descriptions of the foregoing parameters, refer to the foregoing embodiments. Details are not described herein again.

It may be understood that the formula (17) and the formula (18) may be understood as that, in the base station scheduling mode, different control information may include different priorities. In this way, a power control method is used to determine the transmit power of the control channel based on the transmit power allocated to the control channel, the link budget of the control channel, and a threshold power ($P_T$) of the control channel.

However, in the contention mode, different control information may also include different priorities. Therefore, some embodiments of this application further provide a method for determining the transmit power of the control channel. As shown in the following, the transmit power of the control channel may satisfy the following formula:

$$P_{control} = \min\{P_{CMAX} - f(M-N,N), f(N) + P_O + \alpha \cdot PL, P_T - f(M-N,N), P_{MAX\_CBR} - f(M-N,N)\}[dBm] \quad (19)$$

With reference to the formula (10) and the formula (11), the transmit power of the control channel may satisfy the following formula:

$$P_{control} = \min\left\{P_{CMAX} - 10\log_{10}\left(1 + \frac{M-N}{10^{\frac{3}{10}} \times N}\right), 10\log_{10}\left(10^{\frac{3}{10}} \times N\right) + P_O + \alpha \cdot PL, P_T - 10\log_{10}\left(1 + \frac{M-N}{10^{\frac{3}{10}} \times N}\right), P_{MAX\_CBR} - 10\log_{10}\left(1 + \frac{M-N}{10^{\frac{3}{10}} \times N}\right)\right\}[dBm] \quad (20)$$

It may be understood that, for specific descriptions of the foregoing parameters, refer to the foregoing implementations. Details are not described herein again.

It may be understood that, in the foregoing embodiments, the transmit power of the control channel may have another variation. Therefore, the foregoing embodiments should not be construed as a limitation on this application.

2. Transmit Power of the First Data Channel Part:

In some embodiments of this application, the transmit power of the first data channel part may be determined based on the maximum transmit power $P_{CMAX}$, the bandwidth M–N of the first data channel part, and the bandwidth N of the control channel. More specifically, the transmit power of the first data channel part may satisfy the following formula:

$$P_1 = \min\{P_{CMAX} - f(N, M-N), f(M-N) + P_O + \alpha \cdot PL\}[dBm] \quad (21)$$

$P_1$ is the transmit power of the first data channel part, $P_{CMAX}$ is the maximum transmit power, f(N,M–N) is the function of the bandwidth M–N of the first data channel part and the bandwidth N of the control channel, f(M–N) is the function of the bandwidth M–N of the first data channel part, $P_O$ is the target received power of the second terminal device, $\alpha$ is the filtering parameter specified for considering to adjust stability, and may be configured by the higher layer, and PL is the reference link loss.

It may be understood that, f(N,M−N) may be further understood as an expression, a relational expression, or the like between the bandwidth M−N of the first data channel part and the bandwidth N of the control channel, and f(M−N) may be further understood as an expression, a relational expression, or the like of the bandwidth M−N of the first data channel part.

$P_{CMAX}$−f(N,M−N) may be understood as a transmit power allocated to the first data channel part based on the maximum transmit power $P_{CMAX}$ and a ratio of the bandwidth of the first data channel part to the bandwidth of the control channel, and f(M−N)+$P_O$+α·PL may be understood as a link budget of the first data channel part.

Specifically, f(N,M−N) satisfies the following formula:

$$f(N, M-N) = 10\log_{10}\left(1 + 10^{\frac{3}{10}} \times \frac{N}{M-N}\right) [\text{dBm}] \quad (22)$$

Specifically, f(M−N) satisfies the following formula:

$$f(M-N) = 10\log_{10}(M-N) [\text{dBm}] \quad (23)$$

Further, with reference to the formula (22) and the formula (23), the transmit power of the first data channel part may satisfy the following formula:

$$P_1 = \min\left\{P_{CMAX} - 10\log_{10}\left(1 + 10^{\frac{3}{10}} \times \frac{N}{M-N}\right),\right. \quad (24)$$
$$\left. 10\log_{10}(M-N) + P_O + \alpha \cdot PL\right\} [\text{dBm}]$$

Alternatively, this embodiment further provides another form to indicate a formula that the transmit power of the first data channel part satisfies, as shown in the following:

$$P_1 = 10\log_{10}\left(\frac{M-N}{M-N+10^{\frac{3}{10}} \times N}\right) + \quad (25)$$
$$\min\left\{P_{CMAX}, 10\log_{10}\left(M-N+10^{\frac{3}{10}} \times N\right) + P_O + \alpha \cdot PL\right\} [\text{dBm}]$$

The formula (24) and the formula (25) are two different forms of the transmit power of the first data channel part, and transmit powers, of the first data channel part, determined by the first terminal device by using the formula (24) and the formula (25) are consistent.

The formula (21), the formula (24), and the formula (25) that the first data channel part shown above satisfies are shown in the base station scheduling mode. However, in the contention mode, because each sub-channel has a busy power control setting, in some embodiments of this application, the transmit power of the first data channel part may satisfy the following formula:

$$P_1 = \min\{P_{CMAX}-f(N,M-N), f(M-N)+P_O+\alpha \cdot PL,$$
$$P_{MAX\_CBR}-f(N,M-N)\} [\text{dBm}] \quad (26)$$

$P_{MAX\_CBR}$ is a power determined based on the channel busy degree. It may be understood that $P_{MAX\_CBR}$ in the formula (14) and the formula (26) may be understood as a same busy power.

Further, with reference to the formula (22) and the formula (23), in the contention mode, the transmit power of the first data channel part satisfies the following formula:

$$P_1 = \quad (27)$$
$$\min\left\{P_{CMAX} - 10\log_{10}\left(1 + 10^{\frac{3}{10}} \times \frac{N}{M-N}\right), 10\log_{10}(M-N) + P_O + \right.$$
$$\left. \alpha \cdot PL, P_{MAX\_CBR} - 10\log_{10}\left(1 + 10^{\frac{3}{10}} \times \frac{N}{M-N}\right)\right\} [\text{dBm}]$$

Alternatively, in the contention mode, the transmit power of the first data channel part satisfies the following formula:

$$P_1 = 10\log_{10}\left(\frac{M-N}{M-N+10^{\frac{3}{10}} \times N}\right) + \min\{P_{CMAX}, \quad (28)$$
$$10\log_{10}\left(M-N+10^{\frac{3}{10}} \times N\right) + P_O + \alpha \cdot PL, P_{MAX\_CBR}\} [\text{dBm}]$$

It may be understood that, for specific descriptions of the parameters in this embodiment, correspondingly refer to the foregoing implementations. Details are not described herein again.

Further, because services carried by data sent on the data channel have different quality of service (quality of service, QoS), the services carried by the data sent on the data channel may be limited by using different powers. For example, when a service that has a relatively high security requirement, for example, emergency avoidance and automatic driving, is involved, the service that has a relatively high security requirement has a relatively high QoS requirement. In other words, in these scenarios that have relatively high security requirements, the service carried by the data sent on the data channel requires higher QoS. Therefore, in some embodiments of this application, the first terminal device may determine the transmit power of the first data channel part based on the QoS requirement of the service.

Therefore, the transmit power of the first data channel part may satisfy the following formula:

$$P_1=\min\{P_{CMAX}-f(N,M-N), f(M-N)+P_O+\alpha \cdot PL, P_T-f(N, M-N)\} [\text{dBm}] \quad (29)$$

$P_T$ is a transmit power positively correlated with a priority of the service carried by the data sent on the data channel. $P_T$ is a semi-static value configured by the network device, or $P_T$ is a preconfigured fixed value.

$P_T$ may also be understood as a threshold power, in other words, a higher priority of a service indicates higher $P_T$. To be specific, a high-priority service corresponds to a high-threshold power, and a low-priority service corresponds to a low-threshold power.

Specifically, with reference to the formula (22) and the formula (23), in this embodiment, the transmit power of the first data channel part may satisfy the following formula:

$$P_1 = \quad (30)$$
$$\min\left\{P_{CMAX} - 10\log_{10}\left(1 + 10^{\frac{3}{10}} \times \frac{N}{M-N}\right), 10\log_{10}(M-N) + P_O + \right.$$
$$\left. \alpha \cdot PL, P_T - 10\log_{10}\left(1 + 10^{\frac{3}{10}} \times \frac{N}{M-N}\right)\right\} [\text{dBm}]$$

In this embodiment, different threshold powers are set based on QoS requirements of different services, so that reliability of transmission of a high-priority service carried by the first terminal device can be ensured. In addition, different power threshold limitations can be set for services with different priorities, so that the high-priority service has higher reliability when interference is the same.

It may be understood that the formula (29) and the formula (30) may be understood as that, in the base station scheduling mode, different threshold powers are set based on QoS requirements of different services, so that a method is used to determine the transmit power of the first data channel part based on the transmit power allocated to the first data channel part, the link budget of the first data channel part, and a threshold power of the first data channel part.

However, in the contention mode, QoS requirements of different services may be different. Therefore, in some embodiments of this application, the transmit power, of the first data channel part, determined by the first terminal device may further satisfy the following formula:

$$P_1 = \min\{P_{CMAX} - f(N, M-N), f(M-N) + P_O + \alpha \cdot PL, P_T - f(N, M-N), P_{MAX\_CBR} - f(N, M-N)\}[dBm] \quad (31)$$

With reference to the formula (22) and the formula (23), the transmit power of the first data channel part may satisfy the following formula:

$$P_1 = \min\left\{P_{CMAX} - 10\log_{10}\left(1 + 10^{\frac{3}{10}} \times \frac{N}{M-N}\right),\right. \quad (32)$$
$$10\log_{10}(M-N) + P_O + \alpha \cdot PL,$$
$$P_T - 10\log_{10}\left(1 + 10^{\frac{3}{10}} \times \frac{N}{M-N}\right),$$
$$\left.P_{MAX\_CBR} - 10\log_{10}\left(1 + 10^{\frac{3}{10}} \times \frac{N}{M-N}\right)\right\}[dBm]$$

It may be understood that, for specific descriptions of the foregoing parameters, refer to the foregoing implementations. Details are not described herein again.

3. Transmit Power of the Second Data Channel Part:

This embodiment provides two implementations to describe the transmit power of the second data channel part, and the two implementations are respectively as follows.

Implementation 1

In this implementation, a ratio of the transmit power of the second data channel part to the transmit power of the first data channel part is positively correlated with a ratio of a bandwidth of the second data channel part to the bandwidth of the first data channel part. Specifically, the ratio of the transmit power of the second data channel part to the transmit power of the first data channel part is the same as the ratio of the bandwidth of the second data channel part to the bandwidth of the first data channel part.

For this implementation, it may be understood that data is sent at a same transmit power on each resource element (resource element, RE) of the data channel.

Figure 6:
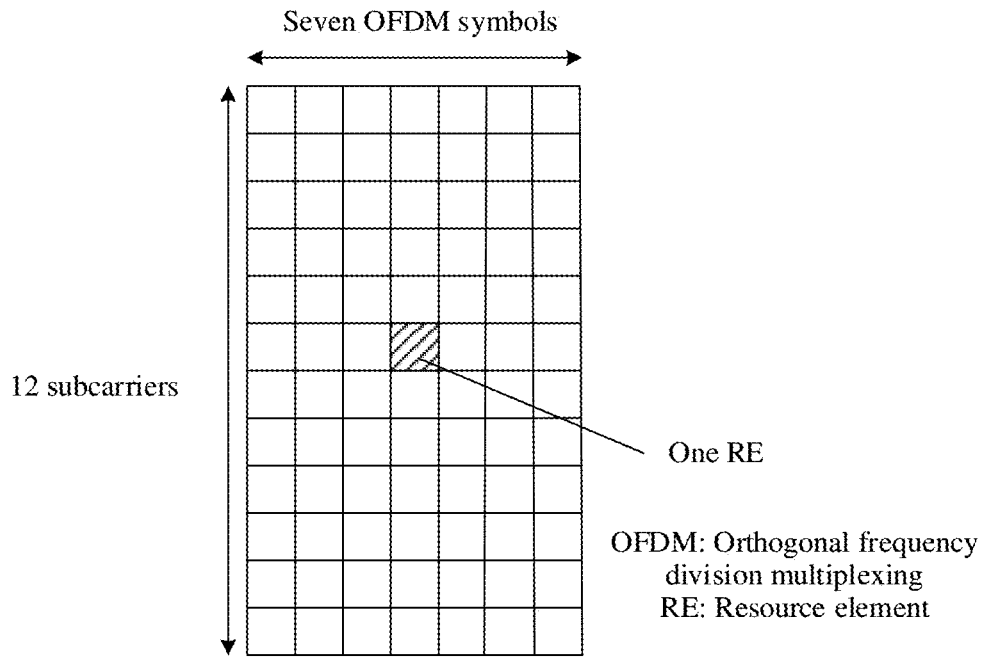
FIG. 6 is a schematic structural diagram of a time-frequency resource according to an embodiment of this application.

In an example, FIG. 6 is a schematic structural diagram of a time-frequency resource according to an embodiment of this application. One RE is one orthogonal frequency division multiplexing (orthogonal frequency division multiplexing, OFDM) symbol in time domain, and is one subcarrier in frequency domain. In an LTE system, the time-frequency resource is divided into an OFDM symbol or a single-carrier frequency division multiple access (single carrier frequency division multiplexing access, SC-FDMA) symbol in a time domain dimension and a subcarrier in a frequency domain dimension, and a minimum resource granularity is referred to as an RE. To be specific, the RE indicates a time-frequency box including one time-domain symbol in time domain and one subcarrier in frequency domain. It may be understood that, the foregoing is merely an example provided in this embodiment of this application. In a future communications technology, a structure of the RE may change. Therefore, the RE shown in FIG. 6 should not be understood as a limitation on this embodiment of this application.

Because the RE is a time-frequency resource, that all REs on the data channel described in this embodiment send data at the same transmit power may be understood as sending data at the same transmit power on a frequency domain resource indicated by the RE. In other words, the transmit power of the control channel, the transmit power of the first data channel part, or the transmit power of the second data channel part described in this embodiment all refer to a transmit power at a moment or in a time unit.

Therefore, in some embodiments of this application, the transmit power of the second data channel part satisfies the following formula:

$$P_2 = P_1 + f(M/(M-N))[dBm] \quad (33)$$

$P_2$ is the transmit power of the second data channel part, and $f(M/(M-N))$ is a function of a bandwidth M of the second data channel part and the bandwidth M−N of the first data channel part. It may be understood that, $f(M/(M-N))$ may be further understood as an expression, a relational expression, or the like between the bandwidth M of the second data channel part and the bandwidth M−N of the first data channel part.

It may be understood that, because the transmit power of the second data channel part is determined based on the transmit power of the first data channel part, correspondingly, in the base station scheduling mode and when there is no threshold power $P_T$, for a formula that the transmit power of the first data channel part satisfies, refer to the example of the transmit power of the first data channel part, that is, refer to one or more of the formula (21), the formula (24), and the formula (25). Correspondingly, for a formula that the transmit power of the control channel satisfies, refer to the example of the transmit power of the control channel, that is, refer to one or more of the formula (9), the formula (12), and the formula (13).

However, in the contention mode and when there is no threshold power, for a formula that the transmit power of the first data channel part satisfies, refer to the example of the transmit power of the first data channel part, that is, refer to one or more of the formula (26), the formula (27), and the formula (28). In addition, for a formula that the transmit power of the control channel satisfies, refer to the example of the transmit power of the control channel, that is, refer to one or more of the formula (14), the formula (15), and the formula (16).

However, in the base station scheduling mode, when different services have different QoS requirements (in other words, there is a threshold power), for a formula that the transmit power of the first data channel part satisfies, refer to the example of the transmit power of the first data channel part, that is, refer to the formula (29) and/or the formula (30). In addition, for a formula that the transmit power of the control channel satisfies, refer to the example of the transmit power of the control channel, that is, refer to the formula (17) and/or the formula (18).

In the contention mode, when different services have different QoS requirements, in other words, when a threshold power is set, for a formula that the transmit power of the first data channel part satisfies, refer to the formula (31) and/or the formula (32) that the transmit power of the first data channel part satisfies. In addition, for a formula that the transmit power of the control channel satisfies, refer to the formula (19) and/or the formula (20).

Further, the transmit power of the second data channel part may satisfy the following formula:

$$P_2 = P_1 + 10 \log_{10}(M/(M-N))[\text{dBm}] \quad (34)$$

With reference to FIG. 5*a*, it can be learned that the actual effective bandwidth M of the second data channel part is greater than the actual effective bandwidth M−N of the first data channel part, and data is sent at a same transmit power on each RE of the first data channel part and of the second data channel part. Therefore, the transmit power of the second data channel part may be amplified in direct proportion to a bandwidth based on the transmit power of the first data channel part.

Based on the implementation 1, a problem that effective bandwidths available on different symbols of the data channel in the frame structure shown in 2d in FIG. 2 are different is resolved, and it is ensured that data can be sent at a same transmit power on each RE of the data channel. Further, the transmit power of the first data channel part has a determined ratio to the transmit power of the second data channel part, and this helps the second terminal device to receive an intermediate frequency scaling factor. In other words, if the second terminal device determines an intermediate frequency scaling factor of the first data channel part, an intermediate frequency scaling factor of the second data channel part may be determined based on the determined ratio, so that received data of an entire slot is in a proper received power range.

For the implementation 1, data is sent at a same transmit power on each RE of the data channel. However, if a link budget of the data channel is relatively high in one transmission, a transmit power of each RE in the first data channel part is determined by an allocated maximum transmit power. In this case, the transmit power of the second data channel part does not reach the maximum transmit power, resulting in remaining transmit power. Therefore, this embodiment of this application provides an implementation 2. In this implementation, data sent on the RE in the first data channel part and sent on the RE in the second data channel part may based on different transmit powers. The details are as follows.

Implementation 2

The transmit power of the second data channel part is determined based on the maximum transmit power $P_{MAX}$, and a link budget of the second data channel part, and the link budget of the second data channel part is determined based on the bandwidth M of the second data channel part.

In other words, in the implementation 2, all powers may be used for the second data channel part alone. That is, compared with the first data channel part and the control channel for which power is allocated, the second data channel part requires no power allocation. Instead, data may be sent at the maximum transmit power. That is, the transmit power of the second data channel part may be determined in the maximum transmit power and the link budget.

Therefore, in some embodiments of this application, the transmit power of the second data channel part may satisfy the following formula:

$$P_2 = \min\{P_{CMAX}, f(M) + P_O + \alpha \cdot PL\}[\text{dBm}] \quad (35)$$

$P_2$ is the transmit power of the second data channel part, $P_{CMAX}$ is the maximum transmit power, f(M) is the function of the bandwidth M of the second data channel part, $P_O$ is the target received power of the second terminal device, α is the filtering parameter specified for considering to adjust stability, and may be configured by the higher layer, and PL is the reference link loss.

Specifically, the transmit power of the second data channel part may satisfy the following formula:

$$P_2 = \min\{P_{CMAX}, 10 \log_{10} M + P_O + \alpha \cdot PL\}[\text{dBm}] \quad (36)$$

For the implementation 2, if a V2X link budget is relatively high, that is, a second part in the min function is relatively large, the transmit power of the data channel is limited, and all REs on the data channel are sent based on two types of transmit powers. In this solution, the first terminal device can fully use available powers, so that the data channel is less affected by power allocation. Particularly, in a scenario in which the bandwidth M of the data channel is relatively small but a relatively long communication distance is required, the second data channel part may be sent at a relatively proper transmit power, thereby improving a detectability probability of the control channel.

It may be understood that, for a formula that the transmit power of the first data channel part satisfies and that corresponds to Embodiment 1, refer to the example of the transmit power of the first data channel part, that is, refer to one or more of the formula (21), the formula (24), and the formula (25). In addition, correspondingly, for a formula that the transmit power of the control channel satisfies, refer to the example of the transmit power of the control channel, that is, refer to one or more of the formula (9), the formula (12), and the formula (13).

The foregoing are formulas that the transmit power of the second data channel part shown in the base station scheduling mode satisfies. In the contention mode, the transmit power of the second data channel part may satisfy the following formula:

$$P_2 = \min\{P_{CMAX}, f(M) + P_O + \alpha \cdot PL, P_{MAX\_CBR}\}[\text{dBM}] \quad (37)$$

$P_2$ is the transmit power of the second data channel part, $P_{CMAX}$ is the maximum transmit power, f(M) is the function of the bandwidth M of the second data channel part, $P_O$ is the target received power of the second terminal device, PL is the reference link loss, and $P_{MAX\_CBR}$ is the power determined based on the channel busy degree.

Specifically, the transmit power of the second data channel part may satisfy the following formula:

$$P_2 = \min\{P_{CMAX}, 10 \log_{10} M + P_O + \alpha \cdot PL, P_{MAX\_CBR}\}[\text{dBm}] \quad (38)$$

Correspondingly, for the transmit power, of the first data channel part, corresponding to this embodiment, refer to the example of the transmit power of the first data channel part in the contention mode, for example, refer to one or more of the formula (26), the formula (27), and the formula (28). In addition, for the transmit power of the control channel, refer to one or more of the formula (14), the formula (15), and the formula (16).

In some embodiments of this application, when services carried by data on the data channel have different QoS requirements, the transmit power of the second data channel part may satisfy the following formula:

$$P_2 = \min\{P_{CMAX}, f(M) + P_O + \alpha \cdot PL, P_T\}[\text{dBm}] \quad (39)$$

$P_2$ is the transmit power of the second data channel part, $P_{CMAX}$ is the maximum transmit power, f(M) is the function of the bandwidth M of the second data channel part, $P_O$ is the target received power of the second terminal device, PL is the reference link loss, and $P_T$ is the transmit power positively correlated with the priority of the service carried by the data sent on the data channel.

Specifically, the transmit power of the second data channel part may satisfy the following formula:

$$P_2=\min\{P_{CMAX}, f(M)+P_O+\alpha \cdot PL, P_T\}[\text{dBm}] \quad (40)$$

Correspondingly, for the transmit power, of the first data channel part, corresponding to this embodiment, refer to the formula (29) and/or the formula (30). For the transmit power, of the control channel, corresponding to this embodiment, refer to the formula (17) and/or the formula (18).

In some embodiments of this application, in the contention mode, QoS requirements of different services may be different. Therefore, the transmit power of the second data channel part may satisfy the following formula:

$$P_2=\min\{P_{CMAX}, f(M)+P_O+\alpha \cdot PL, P_T, P_{MAX\_CBR}\}[\text{dBm}] \quad (41)$$

Specifically, the transmit power of the second data channel part may satisfy the following formula:

$$P_2=\min\{P_{CMAX}, 10\log_{10}M+P_O+\alpha \cdot PL, P_T, P_{MAX\_CBR}\} \\ [\text{dBm}] \quad (42)$$

For a formula that the transmit power of the first data channel part satisfies and that corresponds to this embodiment, refer to the formula (31) and/or the formula (32). In addition, for a formula that the transmit power of the control channel satisfies, refer to the formula (19) and/or the formula (20).

It may be understood that, the foregoing embodiments have different emphases. For implementations or parameters not described in detail in one embodiment, refer to other embodiments. Details are not described herein again.

The foregoing describes how the first terminal device determines the transmit power of the first data channel part, the transmit power of the second data channel pail, and the transmit power of the control channel in different scenarios provided in this application, and includes formulas that the transmit powers calculated by the first terminal device satisfy. The following describes in detail the reference link loss PL that appears in the foregoing formulas.

The reference link loss PL may be determined based on an uplink/downlink transmission loss in a serving cell or a link transmission loss, and the link transmission loss includes a sidelink transmission loss.

Specifically, PL may satisfy the following formula:

$$PL=\min\{PL_1, PL_2\}[\text{dBm}] \quad (43)$$

$PL_1$ may indicate the sidelink transmission loss in sidelink communication, and $PL_2$ may indicate the uplink/downlink transmission loss in the serving cell.

In specific implementation, the NR-V2X may support not only a unicast service but also a multicast or groupcast service. Therefore, in different scenarios, $PL_1$ may have different definitions, as shown in the following.

In an NR-V2X unicast service, for example, in a scenario in which a first terminal device sends data to the second terminal device, the link transmission loss $PL_1$ is a link loss from the first terminal device to the second terminal device.

In other words, PL may be a smaller value of a transmission loss of an NR-V2X link and a transmission loss of a Uu interface (that is, the uplink/downlink transmission loss in the serving cell).

In an NR-V2X multicast or groupcast service, for example, in a scenario in which a first terminal device sends data to a first terminal device set, the link transmission loss $PL_1$ is a largest value of link losses from the first terminal device to terminal devices that are in the first terminal device set.

The first terminal device set may be understood as a set of terminal devices in a multicast or groupcast set, and the first terminal device set includes the second terminal device. Therefore, PL may satisfy the following formula:

$$PL = \min\left\{\max_{i \in P}\{PL\}, PL_2\right\} [\text{dBm}] \quad (44)$$

$PL_i$ indicates a link loss from the first terminal device to an $i^{th}$ terminal device that is in a second terminal device set, and P indicates the second terminal device set (which may also be understood as a receiving user set).

In this embodiment, it may indicate that a largest transmission loss in the multicast or groupcast set is selected as the sidelink transmission loss on the premise that a transmit power of the multicast or groupcast service does not affect a Uu interface service, to ensure that all the terminal devices in the first terminal device set can correctly receive data in one transmission as much as possible.

When location information of the terminal device in the multicast or groupcast set is relatively fixed, the link transmission loss may be determined only based on a transmission loss of a remote terminal device, thereby reducing a quantity of feedbacks. Therefore, the link transmission loss may further be a largest value of link losses from the first terminal device to terminal devices that are in the second terminal device set, where the second terminal device set belongs to the first terminal device set, and a first parameter of the terminal device in the second terminal device set satisfies a threshold range of the first parameter.

The second terminal device set may be understood as a part of terminal devices in the multicast or groupcast set. The first parameter is any one of a reference signal received power (RSRP), a signal to interference plus noise ratio (SINR), a signal-to-noise ratio (SNR), or a channel quality indicator (CQI).

Optionally, the RSRP is used as an example for description, and PL may satisfy the following formula:

$$PL = \min\left\{\max_{RSRP_i<\beta}\{PL_i\}, PL_2\right\}[\text{dBm}] \quad (45)$$

β indicates an RSRP threshold, and $RSRP_i$ indicates a received signal power measured by a terminal device i in the second terminal device set. Therefore, after terminal devices (including the second terminal device) in the second terminal device set feed back the RSRP to the first terminal device, and the first terminal device receives an initial feedback, the first terminal device sorts RSRPs of all terminal devices that are in the multicast or groupcast set. It is determined that all terminal devices whose RSRPs are less than a threshold β continue to provide a feedback, and terminal devices whose RSRPs are greater than or equal to the threshold β may no longer provide a feedback. That is, the link transmission loss may be a function, an expression, or a relational expression of the RSRP.

In this scenario, a sidelink transmission system may perform transmission based on channel quality of the link. Considering the sidelink service, most communication scenarios of the sidelink service are in communication with nearby users. Therefore, a transmit power of a sidelink user can be effectively reduced, inter-user interference is reduced, and a total system throughput is improved.

Figure 7:
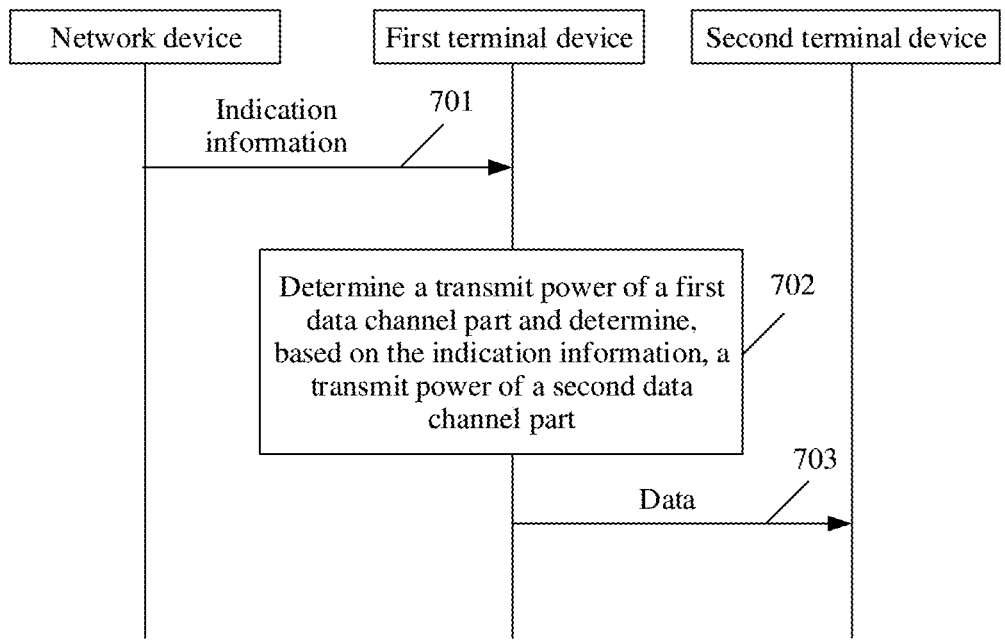
FIG. 7 is a schematic flowchart of another power control method according to an embodiment of this application.

It may be understood that, in the base station scheduling mode, this embodiment of this application provides two implementations to determine the transmit power of the second data channel part, for example, the formula (33) and the formula (35). However, in specific implementation, the first terminal device may not independently determine which formula is used to determine the transmit power of the second data channel part. Therefore, reference may be made to FIG. 7. FIG. 7 is a schematic flowchart of another power control method according to an embodiment of this application. The method may be applied to the terminal devices shown in FIG. 3a to FIG. 3g. As shown in FIG. 7, the power control method may include the following steps.

701: A network device sends indication information to a first terminal device, and the first terminal device receives the indication information from the network device.

The indication information may be used to indicate a transmit power of a second data channel part. Specifically, the indication information may be used to indicate a formula that the transmit power of the second data channel part satisfies.

702: The first terminal device determines a transmit power of a first data channel part, and determines, based on the indication information, the formula that the transmit power of the second data channel part satisfies.

The formula that the transmit power of the second data channel part satisfies and that is determined by the first terminal device is the foregoing formula (33) or formula (35) When the formula that the transmit power of the second data channel part satisfies and that is determined by the first terminal device is the formula (33), the first terminal device may determine the transmit power of the second data channel part according to one or more of the formula (33) and the formula (34). However, when the formula that the transmit power of the second data channel part satisfies and that is determined by the first terminal device is the formula (35), the first terminal device may determine the transmit power of the second data channel part according to one or more of the formula (35) and the formula (36).

703: The first terminal device sends data in the first data channel part to a second terminal device at the transmit power of the first data channel part, and sends data in the second data channel part to the second terminal device at the transmit power of the second data channel part.

By implementing this embodiment of this application, the first terminal device can learn, in a timely and effective manner, of the formula that the transmit power of the second data channel part satisfies, thereby improving efficiency of determining the transmit power of the second data channel part by the first terminal device.

It may be understood that, for an implementation not described in detail in FIG. 7, correspondingly refer to the foregoing implementations. Details are not described herein again.

The foregoing is a method for determining, by the first terminal device, a transmit power of a control channel, the transmit power of the first data channel part, and the transmit power of the second data channel part in this application. The following describes in detail a power control apparatus provided in the embodiments of this application. The apparatus may be configured to perform the method described in the embodiments of this application. The apparatus may be a terminal device (for example, the first terminal device), a component that implements the foregoing functions in the terminal device, or a chip.

Figure 8:
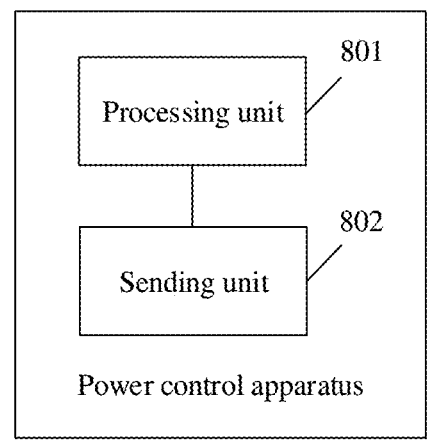
FIG. 8 is a schematic structural diagram of a power control apparatus according to an embodiment of this application.

FIG. 8 is a schematic structural diagram of a power control apparatus according to an embodiment of this application. The power control apparatus may be configured to perform the method described in the embodiments of this application. As shown in FIG. 8, the power control apparatus includes: a processing unit 801, configured to determine a transmit power of a first data channel part and a transmit power of a second data channel part, where the first data channel part is a data channel part that overlaps a control channel in time domain and does not overlap the control channel in frequency domain, and the second data channel part is a data channel part that overlaps the control channel in frequency domain and does not overlap the control channel in time domain; and a sending unit 802, configured to: send data in the first data channel part to a second terminal device at the transmit power of the first data channel part, and send data in the second data channel part to the second terminal device at the transmit power of the second data channel part.

In a possible implementation, when a bandwidth of the control channel is N, and a bandwidth of a data channel is M, a bandwidth of the first data channel part is M−N, where M is greater than N. The transmit power of the first data channel part is determined based on a maximum transmit power, the bandwidth M−N of the first data channel part, and the bandwidth N of the control channel.

In a possible implementation, the transmit power of the first data channel part satisfies the following formula:

$$P_1 = \min\{P_{CMAX} - f(N, M-N), f(M-N) + P_O + \alpha \cdot PL\}$$

$P_1$ is the transmit power of the first data channel part, $P_{CMAX}$ is the maximum transmit power, $f(N, M-N)$ is a function of the bandwidth M−N of the first data channel part and the bandwidth N of the control channel, $f(M-N)$ is a function of the bandwidth M−N of the first data channel part, $P_O$ is a target received power of the second terminal device, and PL is a reference link loss.

In a possible implementation, a ratio of the transmit power of the second data channel part to the transmit power of the first data channel part is positively correlated with a ratio of a bandwidth of the second data channel part to the bandwidth of the first data channel part.

In a possible implementation, the transmit power of the second data channel part satisfies the following formula:

$$P_2 = P_1 + f(M/(M-N))$$

$P_2$ is the transmit power of the second data channel part, and $f(M/(M-N))$ is a function of a bandwidth M of the second data channel part and the bandwidth M−N of the first data channel part.

In a possible implementation, the transmit power of the second data channel part is determined based on the maximum transmit power, and a link budget of the second data channel part, and the link budget of the second data channel part is determined based on a bandwidth M of the second data channel part.

In a possible implementation, the transmit power of the second data channel part satisfies the following formula:

$$P_2 = \min\{P_{CMAX} f(M) + P_O + \alpha \cdot PL\}$$

$P_2$ is the transmit power of the second data channel part, $P_{CMAX}$ is the maximum transmit power, $f(M)$ is a function of the bandwidth M of the second data channel part, $P_O$ is the target received power of the second terminal device, and PL is the reference link loss.

In a possible implementation, the reference link loss PL is determined based on an uplink/downlink transmission loss in a serving cell or a link transmission loss, and the link transmission loss includes a sidelink transmission loss; and the link transmission loss is a link loss from the first terminal device to the second terminal device; the link transmission loss is a largest value of link losses from the first terminal device to terminal devices that are in a first terminal device set; or the link transmission loss is a largest value of link losses from the first terminal device to terminal devices that are in a second terminal device set, where the second terminal device set belongs to the first terminal device set, and a first parameter of the terminal device in the second terminal device set satisfies a threshold range of the first parameter.

In a possible implementation, the first parameter is any one of a reference signal received power RSRP, a signal to interference plus noise ratio SINR, a signal-to-noise ratio SNR, or a channel quality indicator CQI.

Figure 9:
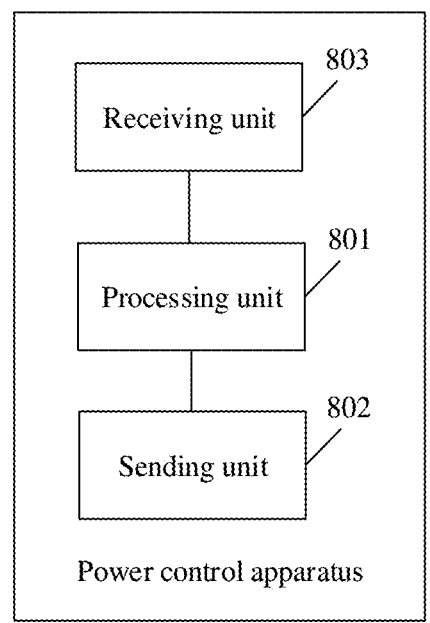
FIG. 9 is a schematic structural diagram of another power control apparatus according to an embodiment of this application.

In a possible implementation, as shown in FIG. 9, the apparatus further includes:
 a receiving unit 803, configured to receive indication information from a network device, where the indication information is used to indicate the transmit power of the second data channel part. The processing unit 801 is specifically configured to determine, based on the indication information, that the transmit power of the second data channel part satisfies the formula $P_2=P_1+f(M/(M-N))$ or $P_2=\min\{P_{CMAX}, f(M)+P_O+\alpha \cdot PL\}$, where $P_2$ is the transmit power of the second data channel part, $f(M/(M-N))$ is the function of the bandwidth M of the second data channel part and the bandwidth M-N of the first data channel part, $P_{CMAX}$ is the maximum transmit power, $f(M)$ is the function of the bandwidth M of the second data channel part, $P_O$ is the target received power of the second terminal device, and PL is the reference link loss.

In a possible implementation, the sending unit 802 and the receiving unit 803 may be integrated into one component. For example, the sending unit 802 and the receiving unit 803 may be transceivers. Alternatively, the sending unit 802 and the receiving unit 803 may be separated into different components. A specific manner of the sending unit 802 and the receiving unit 803 is not limited in this application.

In a possible implementation, the transmit power of the first data channel part satisfies the following formula:

$$P_1=\min\{P_{CMAX}-f(N,M-N), f(M-N)+P_O+\alpha \cdot PL, P_T-f(N,M-N)\}$$

$P_1$ is the transmit power of the first data channel part, $P_{CMAX}$ is the maximum transmit power, $f(N,M-N)$ is a function of the bandwidth M-N of the first data channel part and the bandwidth N of the control channel, $f(M-N)$ is a function of the bandwidth M-N of the first data channel part, $P_O$ is a target received power of the second terminal device, PL is a reference link loss, and $P_T$ is a transmit power positively correlated with a priority of a service carried by data sent on the data channel.

In a possible implementation, the transmit power of the second data channel part satisfies the following formula:

$$P_2=\min\{P_{CMAX}, f(M)+P_O+\alpha \cdot PL, P_T\}$$

$P_2$ is the transmit power of the second data channel part, $P_{CMAX}$ is the maximum transmit power, $f(M)$ is a function of a bandwidth M of the second data channel part, $P_O$ is a target received power of the second terminal device, PL is a reference link loss, and $P_T$ is a transmit power positively correlated with a priority of a service carried by data sent on the data channel.

In a possible implementation, $P_T$ is a semi-static value configured by a network device, or $P_T$ is a preconfigured fixed value.

In a possible implementation, the transmit power of the first data channel part satisfies the following formula:

$$P_1=\min\{P_{CMAX}-f(N,M-N), f(M-N)+P_O+\alpha \cdot PL, P_{MAX\_CBR}-f(N,M-N)\}$$

$P_1$ is the transmit power of the first data channel part, $P_{CMAX}$ is the maximum transmit power, $f(N,M-N)$ is a function of the bandwidth M-N of the first data channel part and the bandwidth N of the control channel, $f(M-N)$ is a function of the bandwidth M-N of the first data channel part, $P_O$ is a target received power of the second terminal device, PL is a reference link loss, and $P_{MAX\_CBR}$ is a power determined based on a channel busy degree.

In a possible implementation, the transmit power of the second data channel part satisfies the following formula:

$$P_2=\min\{P_{CMAX}, f(M)+P_O+\alpha \cdot PL, P_{MAX\_CBR}\}$$

$P_2$ is the transmit power of the second data channel part, $P_{CMAX}$ is the maximum transmit power, $f(M)$ is a function of a bandwidth M of the second data channel part, $P_O$ is a target received power of the second terminal device, PL is a reference link loss, and $P_{MAX\_CBR}$ is a power determined based on a channel busy degree.

In this embodiment of this application, power control may be performed differently on different data channel parts by distinguishing between the first data channel part and the second data channel part. For example, the data in the first data channel part and the data in the second data channel part may be sent at different transmit powers. This avoids sending data at a same transmit power in all cases, thereby avoiding a waste of resources. For example, this avoids a case in which the transmit power of the first data channel part or the second data channel part is excessively high when the transmit power of the data channel is determined based on a same manner, and actually, data can be sent without the excessively high transmit power. In this case, the data channel is divided into two parts, and transmit powers of the two parts are determined respectively. This can satisfy power requirements of different data channel parts, avoid sending data at the same transmit power in all cases which causes the excessively high transmit power of the first data channel part or the second data channel part and causes interference to another terminal device, further reduce the interference to the another terminal device, and improve system performance.

It should be understood that when the power control apparatus is a terminal device or a component that implements the foregoing functions in the terminal device, the processing unit 801 may be one or more processors, the sending unit 802 may be a transmitter, and the receiving unit 803 may be a receiver. Alternatively, the sending unit 802 and the receiving unit 803 are integrated into one component, for example, a transceiver. When the power control apparatus is a chip, the processing unit 801 may be one or more processors, the sending unit 802 may be an output interface, and the receiving unit 803 may be an input interface. Alternatively, the sending unit 802 and the receiving unit 803 are integrated into one unit, for example, an input/output interface.

Figure 10:
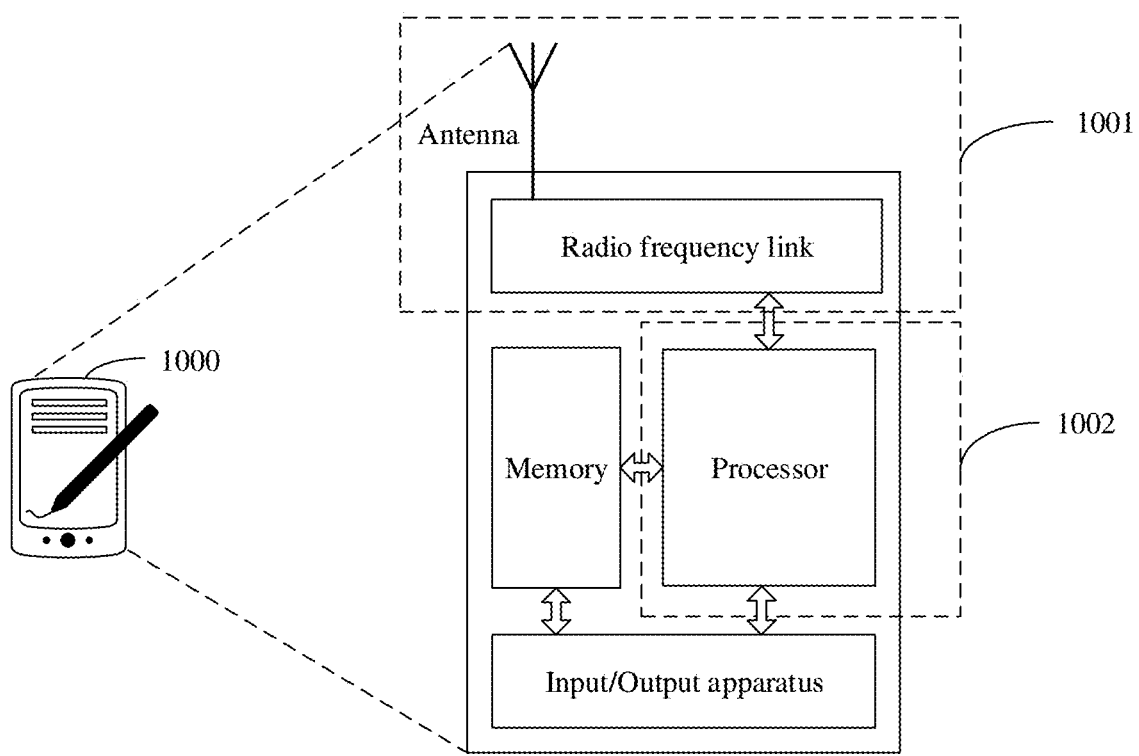
FIG. 10 is a schematic structural diagram of a terminal device according to an embodiment of this application.

FIG. 10 is a schematic structural diagram of a terminal device woo according to an embodiment of this application. The terminal device may perform operations of the first terminal device in the methods shown in FIG. 4 and FIG. 7, or the terminal device may perform operations of the first terminal device shown in FIG. 8 and FIG. 9.

For ease of description, FIG. 10 shows only main components of the terminal device. As shown in FIG. 10, the terminal device woo includes a processor, a memory, a radio-frequency link, an antenna, and an input/output apparatus. The processor is mainly configured to: process a communications protocol and communication data, control the entire terminal device, execute a software program, and process data of the software program, for example, configured to support the terminal device in executing procedures described in FIG. 4 and FIG. 7. The memory is mainly configured to store a software program and data. The radio-frequency link is mainly configured to: convert a baseband signal and a radio frequency signal, and process the radio frequency signal. The antenna panel is mainly configured to transmit and receive a radio frequency signal in an electromagnetic wave form. The terminal device moo may further include the input/output apparatus. The input/output apparatus, such as a touchscreen, a display screen, or a keyboard, is mainly configured to receive data input by a user and output data to the user. It should be noted that some types of terminal devices may have no input/output apparatus.

After the terminal device is powered on, the processor may read a software program in a storage unit, interpret and execute an instruction of the software program, and process data of the software program. When data needs to be sent in a wireless manner, the processor performs baseband processing on to-be-sent data, and then outputs a baseband signal to a radio-frequency link. After performing radio frequency processing on the baseband signal, the radio-frequency link sends a radio frequency signal to the outside by using the antenna in an electromagnetic wave form. When data is sent to the terminal device, the radio-frequency link receives a radio frequency signal through the antenna, converts the radio frequency signal into a baseband signal, and outputs the baseband signal to the processor. The processor converts the baseband signal into data, and processes the data.

Persons skilled in the art may understand that for ease of description, FIG. 10 shows only one memory and one processor. An actual terminal device may have a plurality of processors and a plurality of memories. The memory may also be referred to as a storage medium, a storage device, or the like. This is not limited in the embodiments of this application.

In an optional implementation, the processor may include a baseband processor and a central processing unit (CPU). The baseband processor is mainly configured to process a communication protocol and communication data, and the CPU mainly configured to: control the entire terminal device, execute the software program, and process data of the software program. Optionally, the processor may alternatively be a network processor (NP) or a combination of a CPU and an NP. The processor may further include a hardware chip. The hardware chip may be an application-specific integrated circuit (ASIC), a programmable logic device (PLD), or a combination thereof. The foregoing PLD may be a complex programmable logic device (CPLD), a field programmable gate array (FPGA), a generic array logic (GAL), or any combination thereof. The memory may include a volatile memory, for example, a random access memory (RAM). The memory may alternatively include a non-volatile memory, for example, a flash memory, a hard disk drive (HDD), or a solid-state drive (SSD). The memory may alternatively include a combination of the foregoing types of memories.

For example, in this embodiment of this application, the antenna and the radio-frequency link that have sending and receiving functions may be considered as a transceiver unit 1001 of the terminal device 1000, and the processor that has a processing function may be considered as a processing unit 1002 of the terminal device 1000.

As shown in FIG. 10, the terminal device woo may include a transceiver unit 1001 and a processing unit 1002. The transceiver unit may also be referred to as a transceiver, a transceiver machine, a transceiver apparatus, or the like. Optionally, a component for implementing a receiving function in the transceiver unit 1001 may be considered as a receiving unit, and a component for implementing a sending function in the transceiver unit 1001 may be considered as a sending unit. That is, the transceiver unit 1001 includes the receiving unit and the sending unit. For example, the receiving unit may also be referred to as a receiver machine, a receiver, a receiver circuit, or the like. The sending unit may be referred to as a transmitter machine, a transmitter, a transmitter circuit, or the like.

In some embodiments, the transceiver unit 1001 and the processing unit 1002 may be integrated into one component, or may be separated into different components. In addition, the processor and the memory may be integrated into one component, or may be separated into different components. For example, in an embodiment, the transceiver unit 1001 may be configured to perform the method shown in step 402 shown in FIG. 4. For another example, in an embodiment, the transceiver unit 1001 may be further configured to perform the method shown in step 701 and step 703 shown in FIG. 7.

For another example, in an embodiment, the processing unit 1002 may be configured to control the transceiver unit low to perform the method shown in step 402 shown in FIG. 4, and the processing unit 1002 may be further configured to control the transceiver unit 1001 to perform the method shown in step 701 and step 703 shown in FIG. 7.

For another example, in an embodiment, the processing unit 1002 may be further configured to perform the method shown in step 401 shown in FIG. 4 and the method shown in step 702 shown in FIG. 7.

For another example, in an embodiment, the transceiver unit 1001 may be further configured to perform the method performed by the sending unit 802 and the receiving unit 803. For another example, in an embodiment, the processing unit 1002 may be further configured to perform the method performed by the processing unit 801.

It may be understood that for specific implementations of the terminal device in this embodiment of this application, refer to the foregoing embodiments. Details are not described herein again.

An embodiment of this application further provides a computer-readable storage medium. All or some of the procedures in the foregoing method embodiments may be completed by a computer program instructing related hardware. The program may be stored in the foregoing computer storage medium. When the program is executed, the procedures in the foregoing method embodiments may be included. The computer-readable storage medium may be an internal storage unit of the power control apparatus (including a data transmit end and/or a data receive end) of any one of the foregoing embodiments, for example, a hard disk or memory of the power control apparatus. Alternatively, the computer-readable storage medium may be an external storage device of the power control apparatus, for example, a plug-in hard disk, a smart media card (SMC), a secure digital (SD) card, or a flash card that is disposed on the power control apparatus. Further, the computer-readable storage medium may include both an internal storage unit and an external storage device of the power control apparatus. The computer-readable storage medium is configured to: store the computer program and store other programs and data that are required by the power control apparatus. The computer-readable storage medium may be further configured to temporarily store data that has been output or is to be output.

All or some of the foregoing embodiments may be implemented through software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or another programmable apparatus. The computer instructions may be stored in a computer-readable storage medium, or may be transmitted by using the computer-readable storage medium. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Steps in the method in the embodiments of this application may be adjusted, combined, or deleted according to an actual requirement.

Modules in the apparatus in the embodiments of this application may be adjusted, combined, or deleted according to an actual requirement.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of this application.

What is claimed is:

1. A method, comprising:
receiving data in a data channel, wherein the data channel is sent at a transmit power of the data channel, wherein the transmit power of the data channel comprises a transmit power of a first data channel part and a transmit power of a second data channel part, wherein the first data channel part is a part of the data channel and has a same time domain resource as a control channel, and the second data channel part is another part of the data channel and has a different time domain resource than the control channel, wherein the first data channel part does not overlap with the control channel in frequency domain, and wherein the transmit power of the first data channel part and the transmit power of the second data channel part satisfy:

$P_1 = P_2 + 10 \log_{10}(M-N/M)[\text{dBm}]$, wherein $P_2$ is the transmit power of the second data channel part, $P_1$ is the transmit power of the first data channel part, a bandwidth of the control channel is N, a bandwidth of the data channel is M, a bandwidth of the first data channel part is M−N, and a bandwidth of the second data channel part is M, and wherein M is greater than N; and
wherein data in the first data channel part is sent at the transmit power of the first data channel part, and data in the second data channel part is sent at the transmit power of the second data channel part.

2. The method according to claim 1, wherein the transmit power of the first data channel part is determined based on a maximum transmit power, the bandwidth M−N of the first data channel part, and the bandwidth N of the control channel.

3. The method according to claim 1, wherein the transmit power of the first data channel part satisfies:

$P_1 = \min\{P_{CMAX} - f(N,M-N), f(M-N) + P_O + \alpha \cdot PL, P_{MAX\_CBR} - f(N,M-N)\}$, wherein
$P_{CMAX}$ is a maximum transmit power, f(N, M−N) is a function of the bandwidth M−N of the first data channel part and the bandwidth N of the control channel, f(M−N) is a function of the bandwidth M−N of the first data channel part, $P_O$ is a target received power of a second terminal device, PL is a reference link loss, $\alpha$ is a filtering parameter, and $P_{MAX\_CBR}$ is a power determined based on a channel busy degree.

4. The method according to claim 3, wherein:
the reference link loss PL is determined based on an uplink/downlink transmission loss in a serving cell or a sidelink transmission loss; and
the sidelink transmission loss is a link loss from a first terminal device to the second terminal device.

5. The method according to claim 4, wherein the reference link loss PL satisfies:
PL = min $\{PL_1, PL_2\}$[dBm], wherein $PL_1$ indicates the sidelink transmission loss in sidelink communication, and $PL_2$ indicates the uplink/downlink transmission loss in the serving cell.

6. The method according to claim 1, wherein the transmit power of the second data channel part is determined based on a maximum transmit power and a link budget of the second data channel part, and wherein the link budget of the second data channel part is determined based on the bandwidth M of the second data channel part.

7. The method according to claim 1, wherein the transmit power of the second data channel part satisfies:
$P_2 = \min\{P_{CMAX}, f(M) + P_O + \alpha \cdot PL, P_{MAX\_CBR}\}$, wherein $P_{CMAX}$ is a maximum transmit power, f(M) is a function of the bandwidth M of the second data channel part, $P_O$ is a target received power of a second terminal device, PL is a reference link loss, $P_{MAX\_CBR}$ is a power determined based on a channel busy degree, and $\alpha$ is a filtering parameter; and
wherein the transmit power of the first data channel part is determined based on the maximum transmit power, the bandwidth M−N of the first data channel part, and the bandwidth N of the control channel, M is greater than N, and wherein the transmit power of the first data channel part satisfies:

$P_1 = \min\{P_{CMAX} - f(N,M-N), f(M-N) + P_O + \alpha \cdot PL, P_{MAX\_CBR} - f(N,M-N)\}$, wherein f(N,M−N) is a function of the bandwidth M−N of the first data channel part and the bandwidth N of the control channel, and f(M−N) is a function of the bandwidth M−N of the first data channel part.

8. An apparatus, comprising:
one or more processors, wherein execution of instructions by the one or more processors causes the apparatus to:
receive data in a data channel, wherein the data channel is sent at a transmit power of the data channel, wherein the transmit power of the data channel comprises a transmit power of a first data channel part and a transmit power of a second data channel part, wherein the first data channel part is a part of the data channel and has a same time domain resource as a control channel, and the second data channel part is another part of the data channel and has a different time domain resource than the control channel, wherein the first data channel part does not overlap with the control channel in frequency domain, and wherein the transmit power of the first data channel part and the transmit power of the second data channel part satisfy:

$$P_1 = P_2 + 10 \log_{10}(M-N/M)[dBm]$$

wherein $P_2$ is the transmit power of the second data channel part, $P_1$ is the transmit power of the first data channel part, a bandwidth of the control channel is N, a bandwidth of the data channel is M, a bandwidth of the first data channel part is M−N, and a bandwidth of the second data channel part is M, and wherein M is greater than N; and
wherein data in the first data channel part is sent at the transmit power of the first data channel part, and data in the second data channel part is sent at the transmit power of the second data channel part.

9. The apparatus according to claim 8, wherein the transmit power of the first data channel part is determined based on a maximum transmit power, the bandwidth M−N of the first data channel part, and the bandwidth N of the control channel.

10. The apparatus according to claim 8, wherein the transmit power of the first data channel part satisfies:

$$P_1 = \min\{P_{CMAX} - f(N,M-N), f(M-N) + P_O + \alpha \cdot PL, P_{MAX\_CBR} - f(N,M-N)\},$$

wherein $P_{CMAX}$ is a maximum transmit power, $f(N,M-N)$ is a function of the bandwidth M−N of the first data channel part and the bandwidth N of the control channel, $f(M-N)$ is a function of the bandwidth M−N of the first data channel part, $P_O$ is a target received power of the apparatus, PL is a reference link loss, $\alpha$ is a filtering parameter, and $P_{MAX\_CBR}$ is a power determined based on a channel busy degree.

11. The apparatus according to claim 10, wherein:
the reference link loss PL is determined based on an uplink/downlink transmission loss in a serving cell or a sidelink transmission loss; and
the sidelink transmission loss is a link loss from a first terminal device to the apparatus.

12. The apparatus according to claim 11, wherein the reference link loss PL satisfies:
$PL = \min\{PL_1, PL_2\}[dBm]$, wherein $PL_1$ indicates the sidelink transmission loss in sidelink communication, and $PL_2$ indicates the uplink/downlink transmission loss in the serving cell.

13. The apparatus according to claim 8, wherein the transmit power of the second data channel part is determined based on a maximum transmit power and a link budget of the second data channel part, and the link budget of the second data channel part is determined based on the bandwidth M of the second data channel part.

14. The apparatus according to claim 8, wherein the transmit power of the second data channel part satisfies:

$P_2 = \min\{P_{CMAX}, f(M) + P_O + \alpha \cdot PL, P_{MAX\_CBR}\}$, wherein $P_{CMAX}$ is a maximum transmit power, $f(M)$ is a function of a bandwidth M of the second data channel part, $P_O$ is a target received power of the apparatus, PL is a reference link loss, $P_{MAX\_CBR}$ is a power determined based on a channel busy degree, and $\alpha$ is a filtering parameter; and
wherein the transmit power of the first data channel part is determined based on the maximum transmit power, the bandwidth M−N of the first data channel part, and the bandwidth N of the control channel, wherein M is greater than N, and wherein the transmit power of the first data channel part satisfies:

$$P_1 = \min\{P_{CMAX} - f(N,M-N), f(M-N) + P_O + \alpha \cdot PL, P_{MAX\_CBR} - f(N,M-N)\},$$

wherein $f(N,M-N)$ is a function of the bandwidth M−N of the first data channel part and the bandwidth N of the control channel, and $f(M-N)$ is a function of the bandwidth M−N of the first data channel part.

15. A non-transitory computer-readable storage medium comprising instructions which, when executed by at least one processor of a computer, cause the computer to:
receive data in a data channel, wherein the data channel is sent at a transmit power of the data channel, wherein the transmit power of the data channel comprises a transmit power of a first data channel part and a transmit power of a second data channel part, wherein the first data channel part is a part of the data channel and has a same time domain resource as a control channel, and the second data channel part is another part of the data channel and has a different time domain resource than the control channel, wherein the first data channel part does not overlap with the control channel in frequency domain, and wherein the transmit power of the first data channel part and the transmit power of the second data channel part satisfy:

$$P_1 = P_2 + 10 \log_{10}(M-N/M)[dBm]$$

wherein $P_2$ is the transmit power of the second data channel part, $P_1$ is the transmit power of the first data channel part, a bandwidth of the control channel is N, a bandwidth of the data channel is M, a bandwidth of the first data channel part is M−N, and a bandwidth of the second data channel part is M, and wherein M is greater than N; and
wherein data in the first data channel part is sent at the transmit power of the first data channel part, and data in the second data channel part is sent at the transmit power of the second data channel part.

16. The non-transitory computer-readable storage medium according to claim 15, wherein the transmit power of the first data channel part is determined based on a maximum transmit power, the bandwidth M−N of the first data channel part, and the bandwidth N of the control channel.

17. The non-transitory computer-readable storage medium according to claim 15, wherein the transmit power of the first data channel part satisfies:

$$P_1 = \min\{P_{CMAX} - f(N, M-N), f(M-N) + P_O + \alpha \cdot PL, P_{MAX\_CBR} - f(N,M-N)\},$$

wherein $P_{CMAX}$ is a maximum transmit power, $f(N, M-N)$ is a function of the bandwidth M−N of the first data channel part and the bandwidth N of the control channel, $f(M-N)$ is a function of the bandwidth M−N of the first data channel part, $P_O$ is a target received power of a second terminal device, PL is a reference link loss, $\alpha$ is a filtering parameter, and $P_{MAX\_CBR}$ is a power determined based on a channel busy degree.

18. The non-transitory computer-readable storage medium according to claim 17, wherein:
- the reference link loss PL is determined based on an uplink/downlink transmission loss in a serving cell or a sidelink transmission loss;
- the sidelink transmission loss is a link loss from a first terminal device to the second terminal device; and
- the reference link loss PL satisfies:
- PL=min{$PL_1$, $PL_2$}[dBm], wherein $PL_1$ indicates the sidelink transmission loss in sidelink communication, and $PL_2$ indicates the uplink/downlink transmission loss in the serving cell.

19. The non-transitory computer-readable storage medium according to claim 15, wherein the transmit power of the second data channel part is determined based on a maximum transmit power and a link budget of the second data channel part, and wherein the link budget of the second data channel part is determined based on the bandwidth M of the second data channel part.

20. The non-transitory computer-readable storage medium according to claim 15, wherein the transmit power of the second data channel part satisfies:
- $P_2$=min{$P_{CMAX}$, f(M)+$P_O$+$\alpha$·PL, $P_{MAX\_CBR}$}, wherein PCMAX is a maximum transmit power, f(M) is a function of a bandwidth M of the second data channel part, $P_O$ is a target received power of a second terminal device, PL is a reference link loss, $P_{MAX\_CBR}$ is a power determined based on a channel busy degree, and $\alpha$ is a filtering parameter; and
- wherein the transmit power of the first data channel part is determined based on the maximum transmit power, the bandwidth M−N of the first data channel part, and the bandwidth N of the control channel, M is greater than N, and wherein the transmit power of the first data channel part satisfies:

$P_1$=min{$P_{CMAX}$−f(N, M−N), f(M−N)+$P_O$+$\alpha$·PL, $P_{MAX\_CBR}$−f(N,M−N)}, wherein f(N,M−N) is a function of the bandwidth M−N of the first data channel part and the bandwidth N of the control channel, and f(M−N) is a function of the bandwidth M−N of the first data channel part.

* * * * *

UNITED STATES PATENT AND TRADEMARK OFFICE
CERTIFICATE OF CORRECTION

PATENT NO. : 12,200,633 B2
APPLICATION NO. : 18/491566
DATED : January 14, 2025
INVENTOR(S) : Guo et al.

It is certified that error appears in the above-identified patent and that said Letters Patent is hereby corrected as shown below:

In the Specification

In Column 6, Line 64, delete "f(M(M-N))" and insert -- f(M/(M-N)) --.

In Column 13, Line 47, delete "scheduling," and insert -- scheduling. --.

In Column 19, Line 8, after "transmit" insert -- power, --.

In Column 27, Line 34, delete "pail," and insert -- part, --.

In Column 28, Lines 7-8, delete "{PL}," and insert -- $\{PL_i\}$, --.

In Column 29, Line 27, delete "(35)" and insert -- (35). --.

In Column 32, Line 61, delete "woo" and insert -- 1000 --.

In Column 33, Line 1, delete "woo" and insert -- 1000 --.

In Column 33, Line 14, delete "moo" and insert -- 1000 --.

In Column 34, Line 3, delete "woo" and insert -- 1000 --.

In Column 34, Line 30, delete "low" and insert -- 1001 --.

In the Claims

In Column 36, in Claim 5, Line 36, delete "$\{PL_1, PL_2)\}$" and insert -- $\{PL_1,PL_2\}$ --.

Signed and Sealed this
Eighteenth Day of February, 2025

Coke Morgan Stewart
*Acting Director of the United States Patent and Trademark Office*

CERTIFICATE OF CORRECTION (continued)
U.S. Pat. No. 12,200,633 B2

In Column 38, in Claim 15, Line 39, delete "[dBm]" and insert -- [dBm], --.

In Column 40, in Claim 20, Line 5, delete "PCMAX" and insert -- $P_{CMAX}$ --.